United States Patent
Christner et al.

(10) Patent No.: US 12,468,713 B2
(45) Date of Patent: Nov. 11, 2025

(54) FUNCTION REGISTRY IN FUNCTION-AS-A-SERVICE ENVIRONMENTS

(71) Applicant: Dell Products L.P., Round Rock, TX (US)

(72) Inventors: Joel Evans Christner, El Dorado Hills, CA (US); Trevor Scott Conn, Leander, TX (US); Richard A Backhouse, Apex, NC (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/646,118

(22) Filed: Apr. 25, 2024

(65) Prior Publication Data

US 2025/0335449 A1    Oct. 30, 2025

(51) Int. Cl.
*G06F 16/2457* (2019.01)
*H04L 67/60* (2022.01)

(52) U.S. Cl.
CPC ........ *G06F 16/24573* (2019.01); *H04L 67/60* (2022.05)

(58) Field of Classification Search
CPC ... G05B 2219/34202; G06F 8/00; G06F 8/70; G06F 8/34; G06F 8/36; G06N 3/10; H04L 67/34
See application file for complete search history.

(56) References Cited

U.S. PATENT DOCUMENTS

| | | | |
|---|---|---|---|
| 2004/0154000 A1* | 8/2004 | Kasravi | G06F 11/3608 717/130 |
| 2014/0089895 A1* | 3/2014 | Clee | G06F 11/3604 717/121 |
| 2014/0359574 A1* | 12/2014 | Beckwith | G06F 8/33 717/113 |
| 2016/0321064 A1* | 11/2016 | Sankaranarasimhan | H04L 67/34 |
| 2020/0097261 A1* | 3/2020 | Smith | G06F 40/174 |
| 2021/0056100 A1* | 2/2021 | Steinhauser | G06F 16/248 |
| 2023/0273776 A1* | 8/2023 | Wang | G06F 8/33 717/106 |

* cited by examiner

*Primary Examiner* — William P Bartlett
(74) *Attorney, Agent, or Firm* — Chamberlain, Hrdlicka, White, Williams & Aughtry; Aly Z. Dossa

(57) ABSTRACT

A method for maintaining a function registry includes: obtaining, by a function-as-a-service (FaaS) function registry manager of a FaaS environment, a user query parameter from a first client, wherein the FaaS environment includes a FaaS function registry; in response to the obtaining: comparing the user query parameter with metadata parameters of the FaaS function registry; identifying at least a first function in the FaaS function registry with metadata parameters that match the user query parameter; and providing a first function image and first function metadata associated with the at least the first function to the first client, wherein the first client performs code-ahead and real-time documentation using the first function image and the first function metadata.

14 Claims, 12 Drawing Sheets

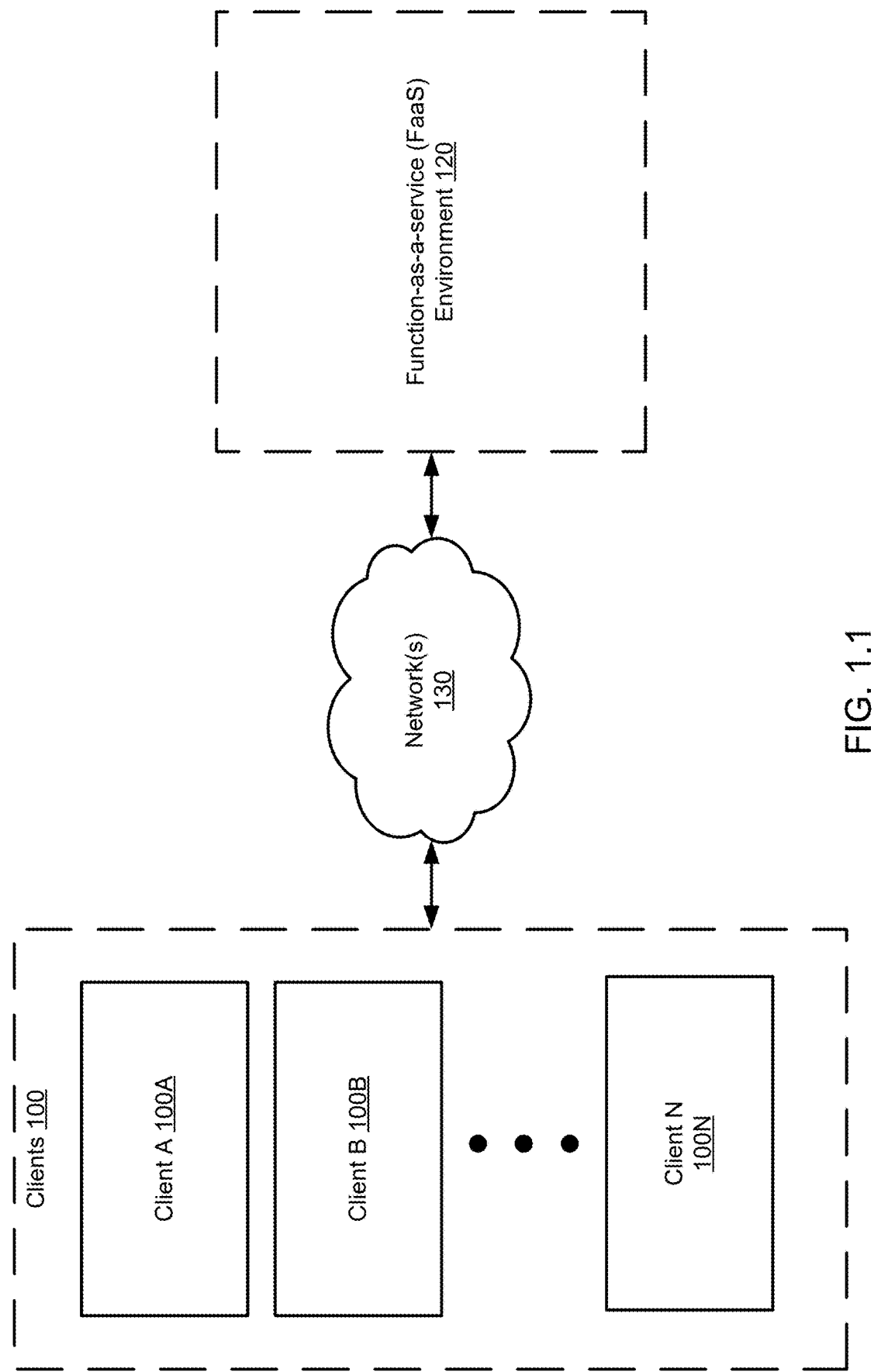
FIG. 1.1

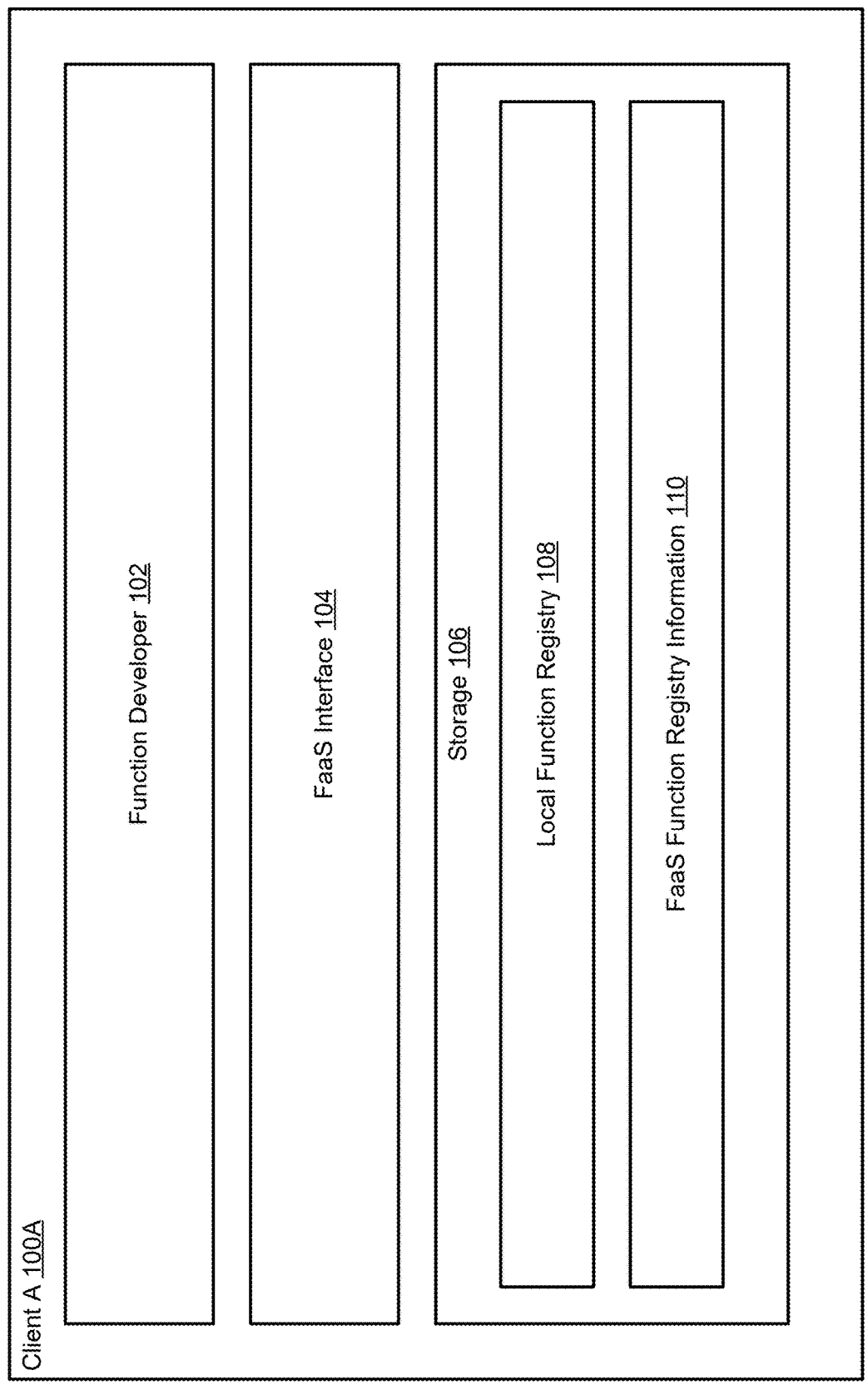
FIG. 1.2

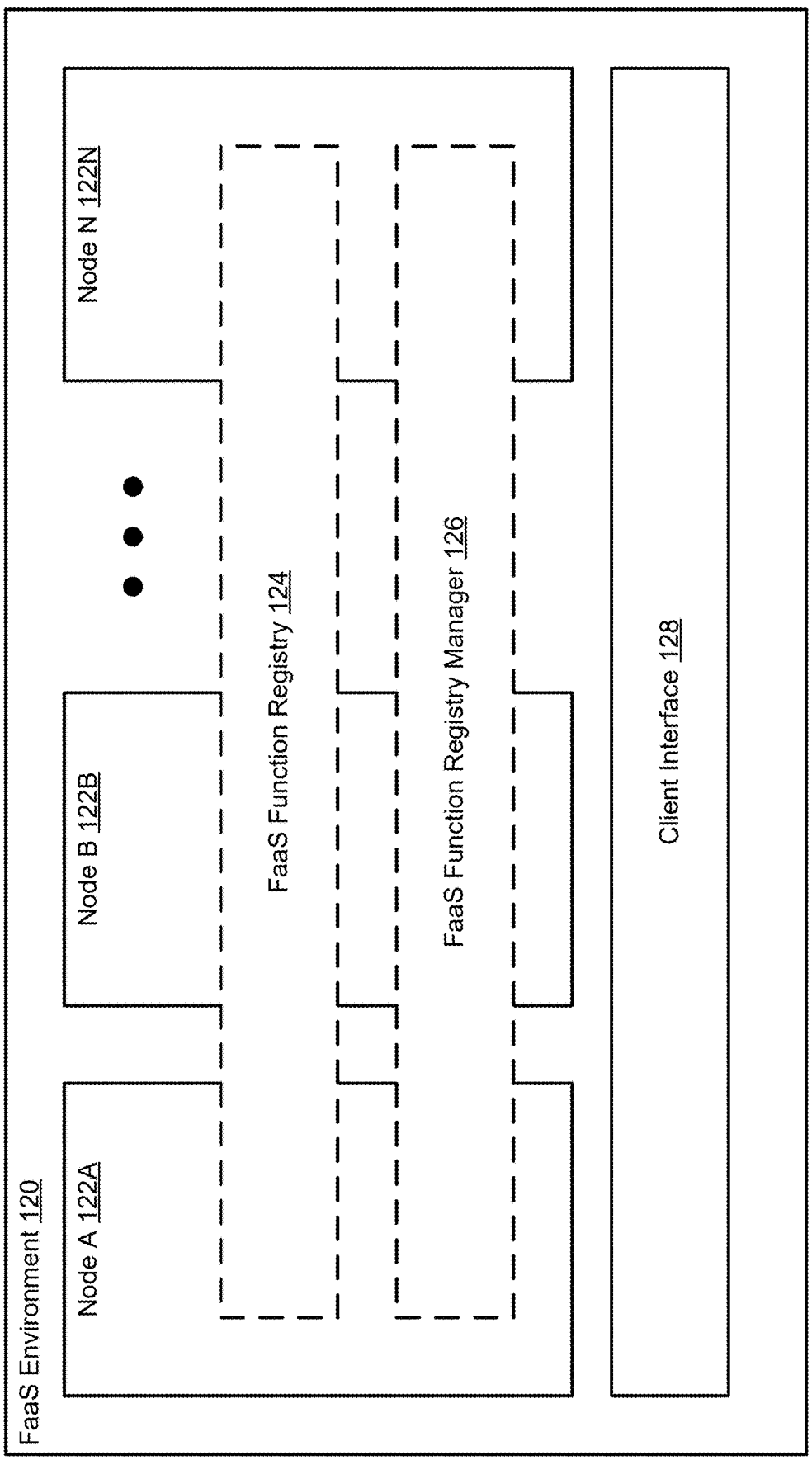
FIG. 1.3

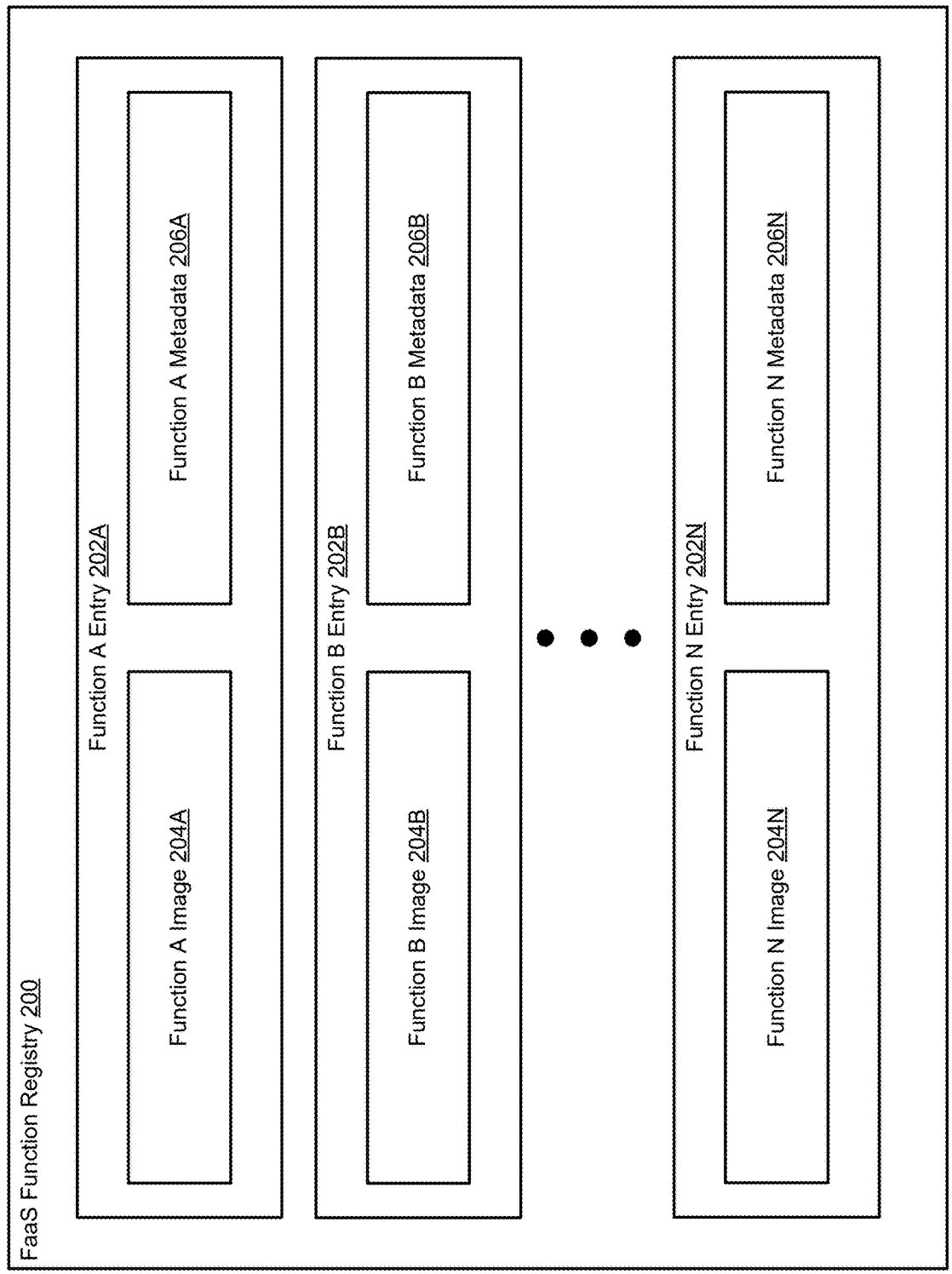
FIG. 2.1

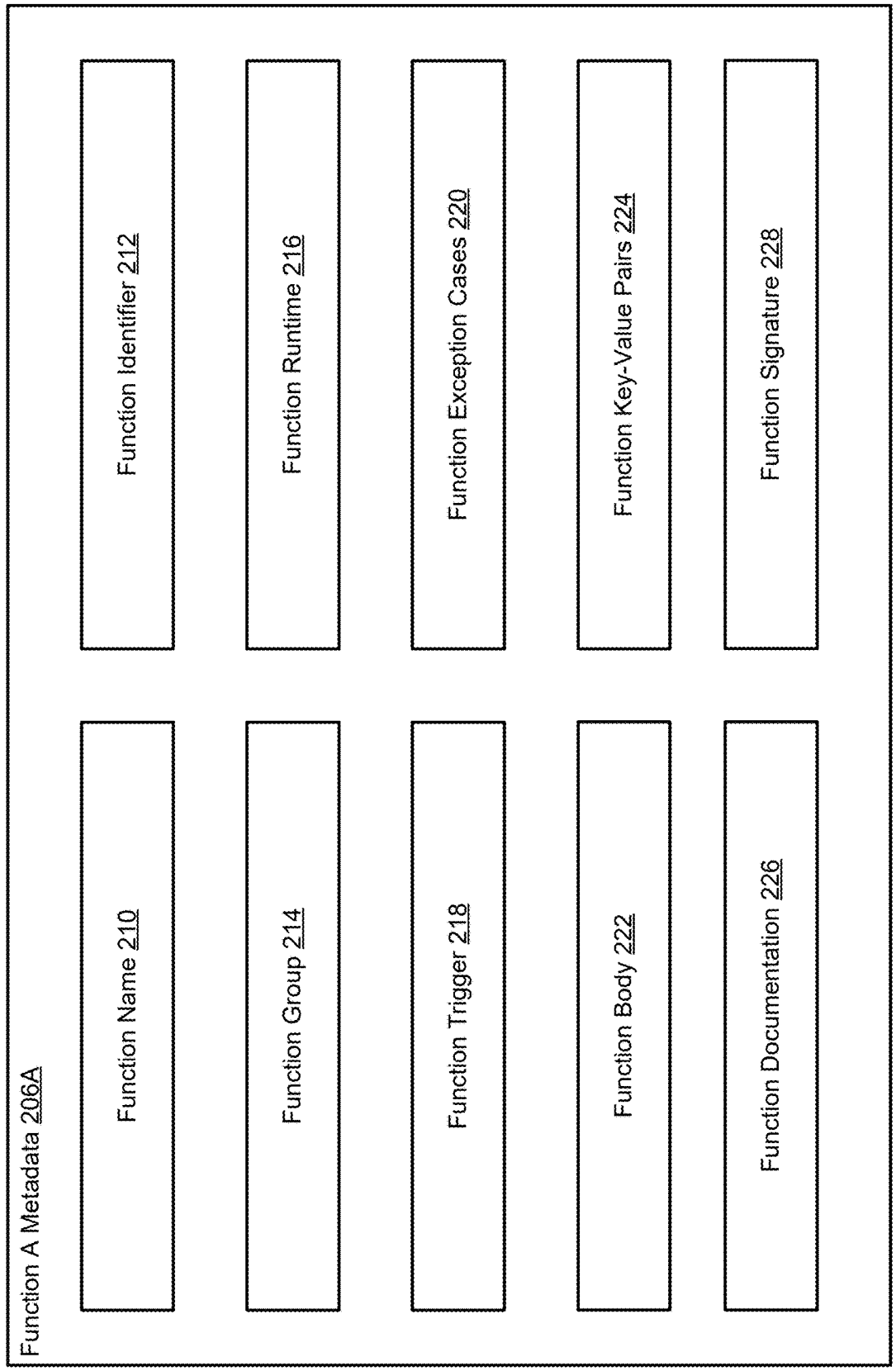
FIG. 2.2

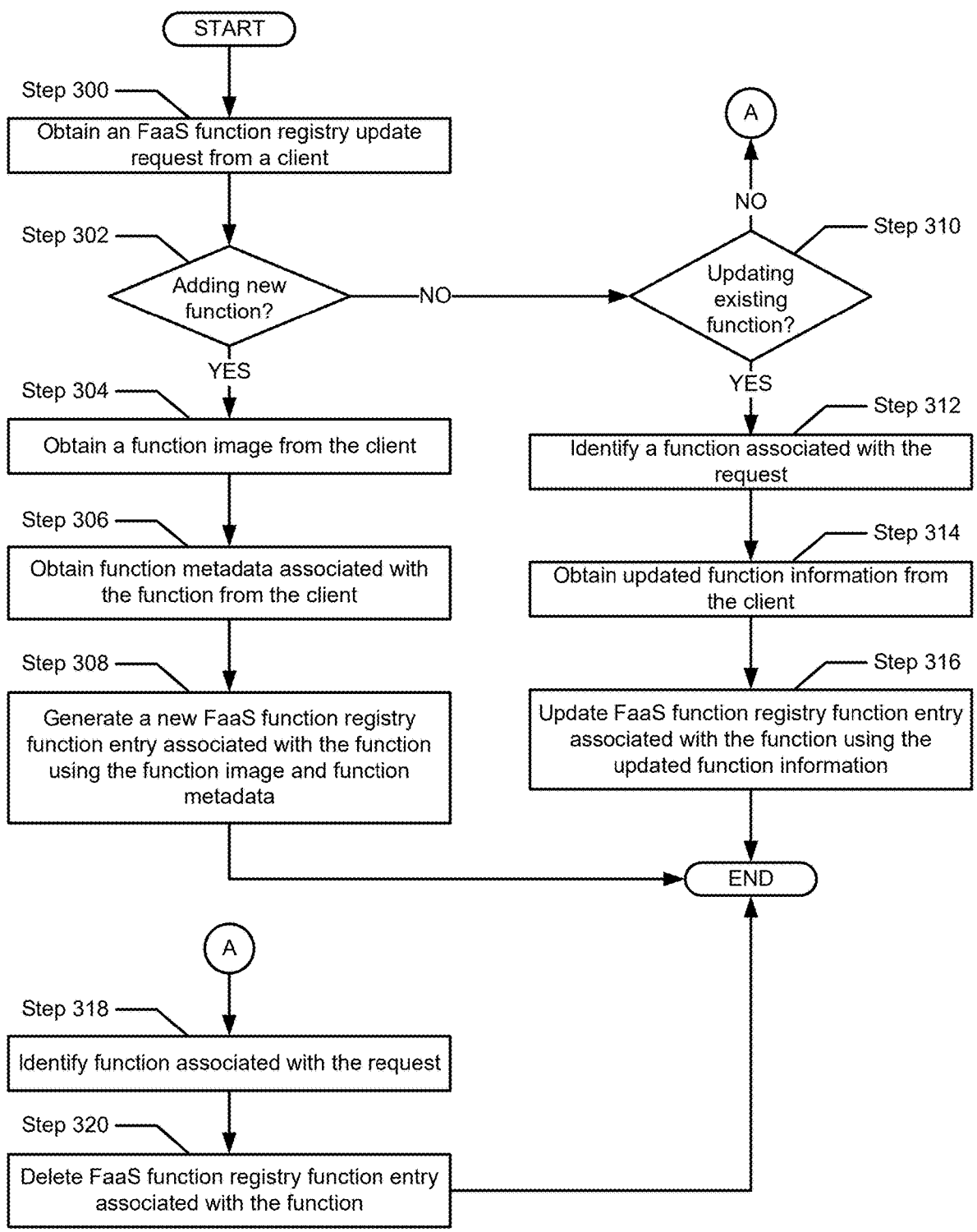
FIG. 3.1

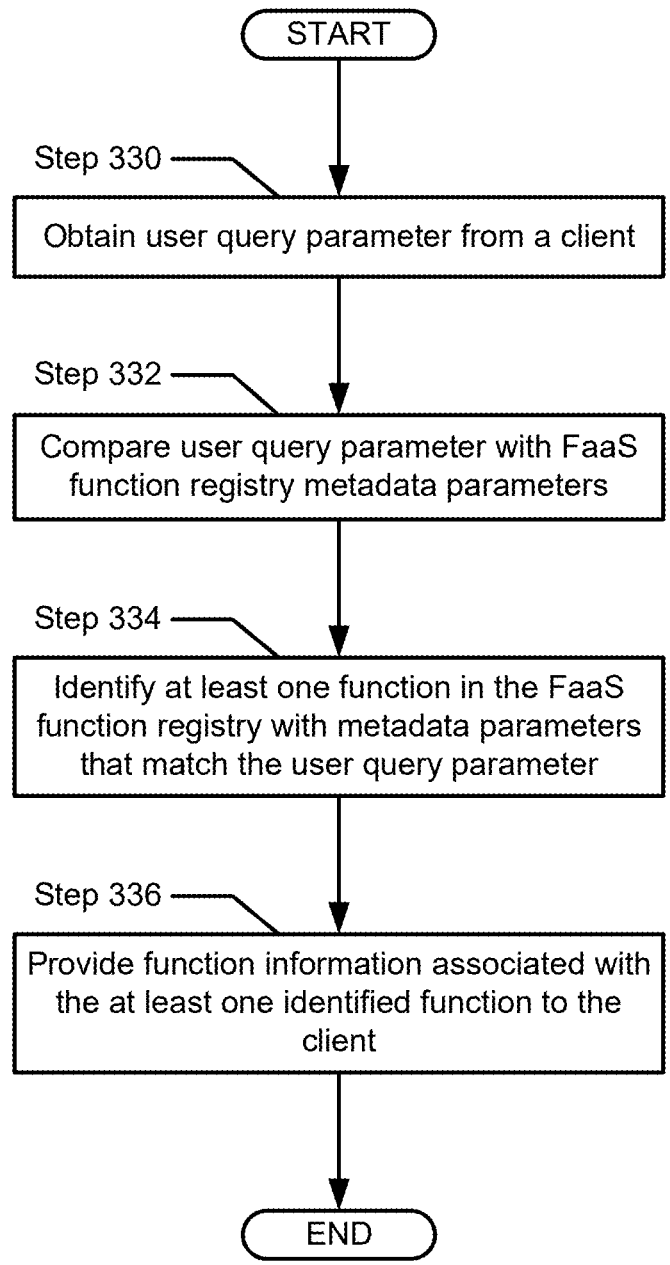
FIG. 3.2

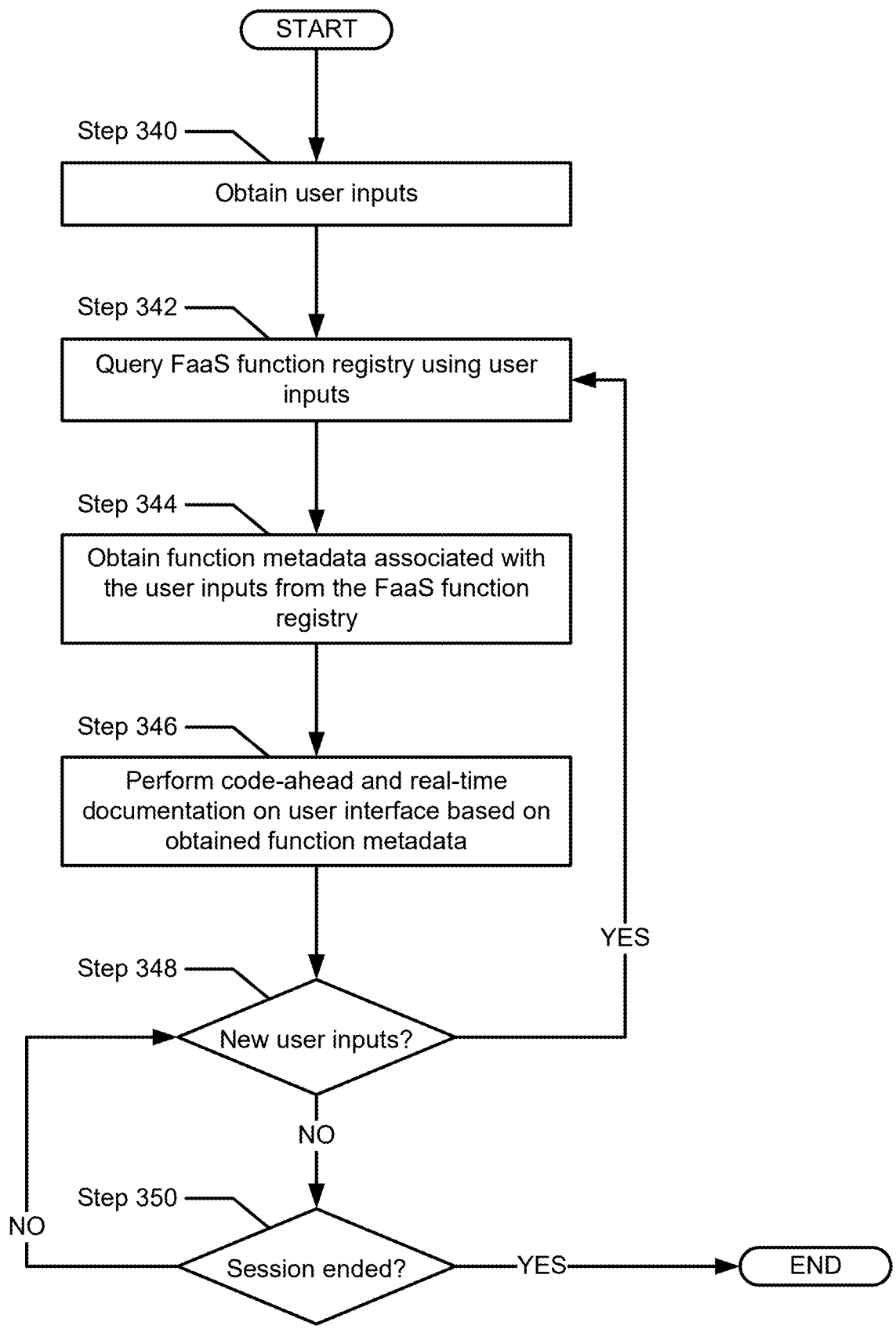
FIG. 3.3

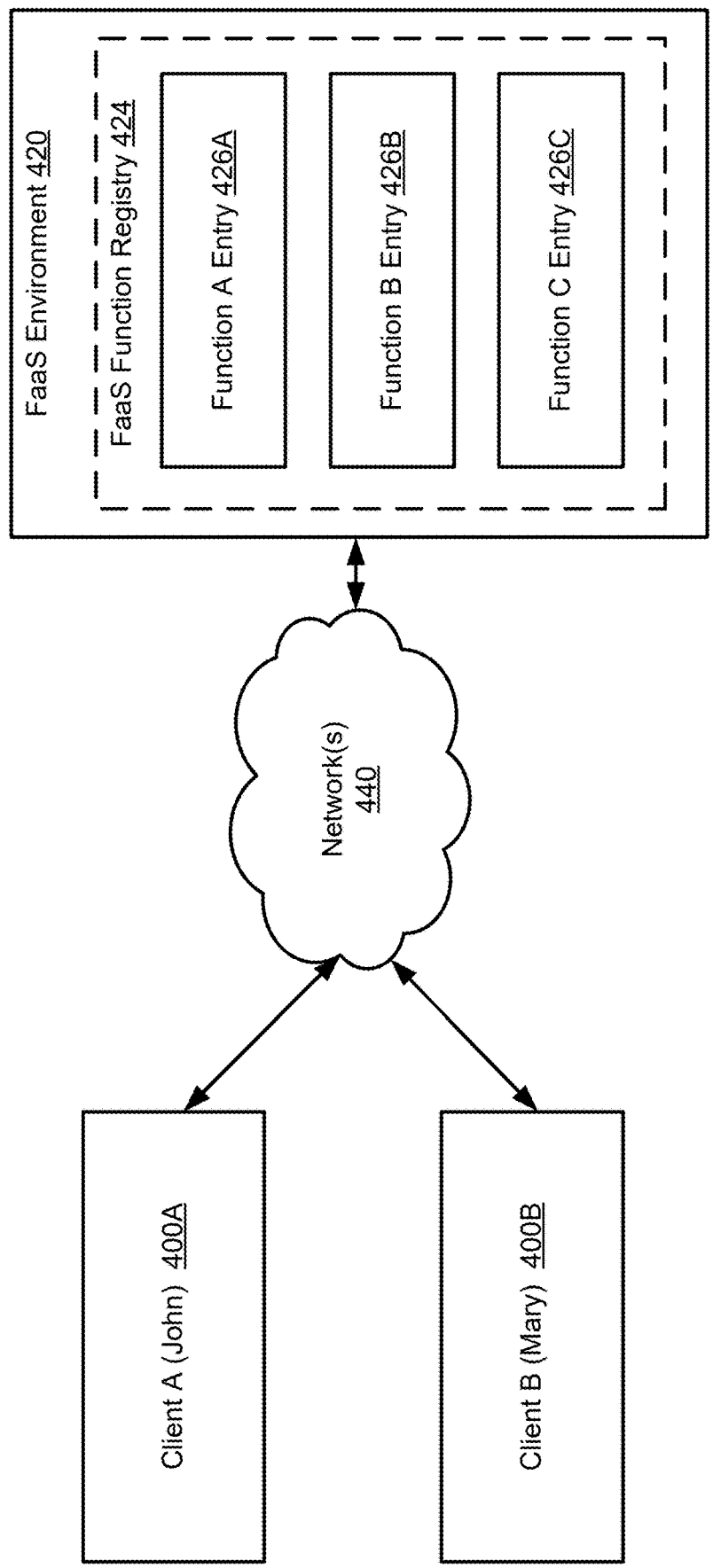
FIG. 4.1

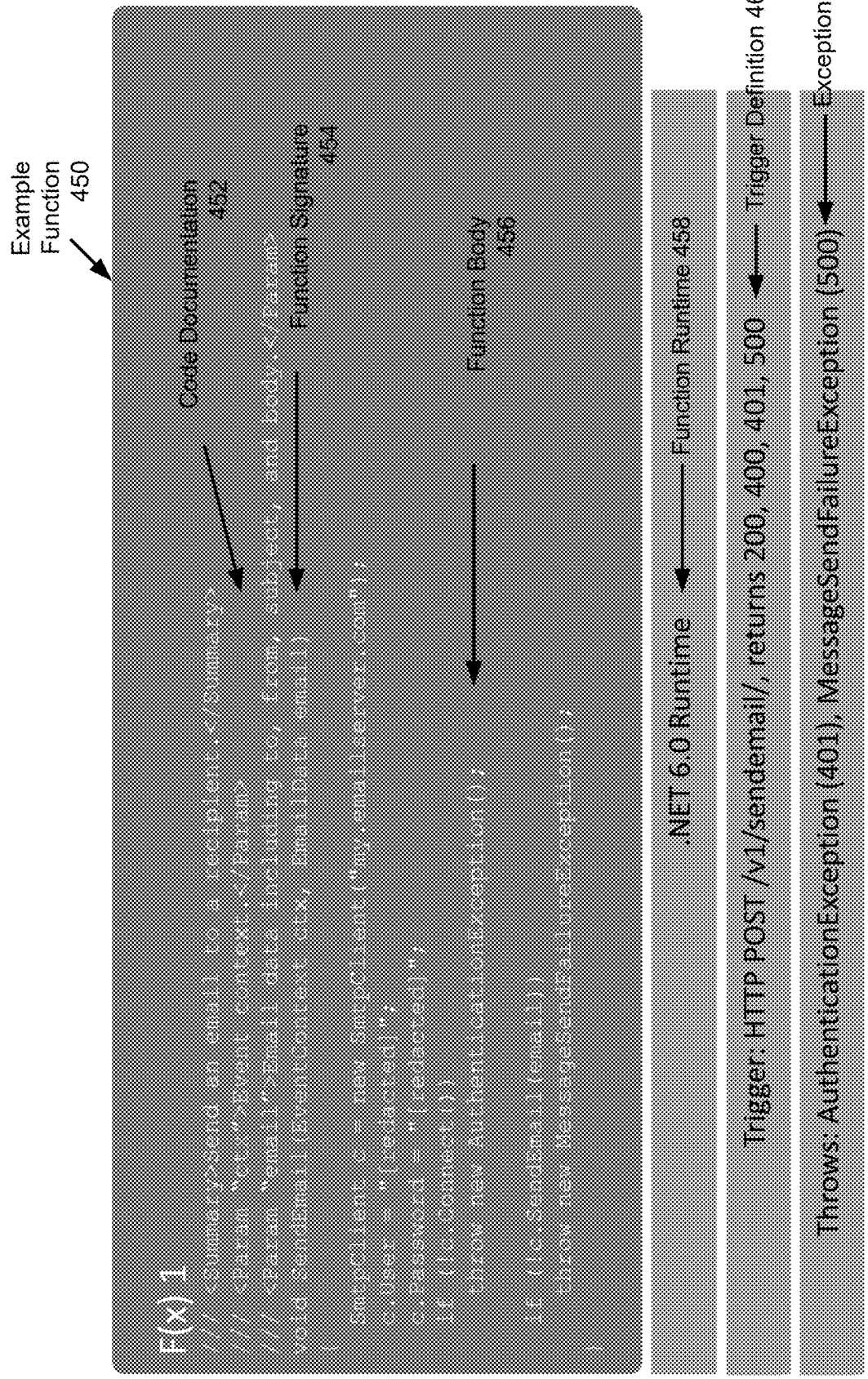
FIG. 4.2

Figure 4:
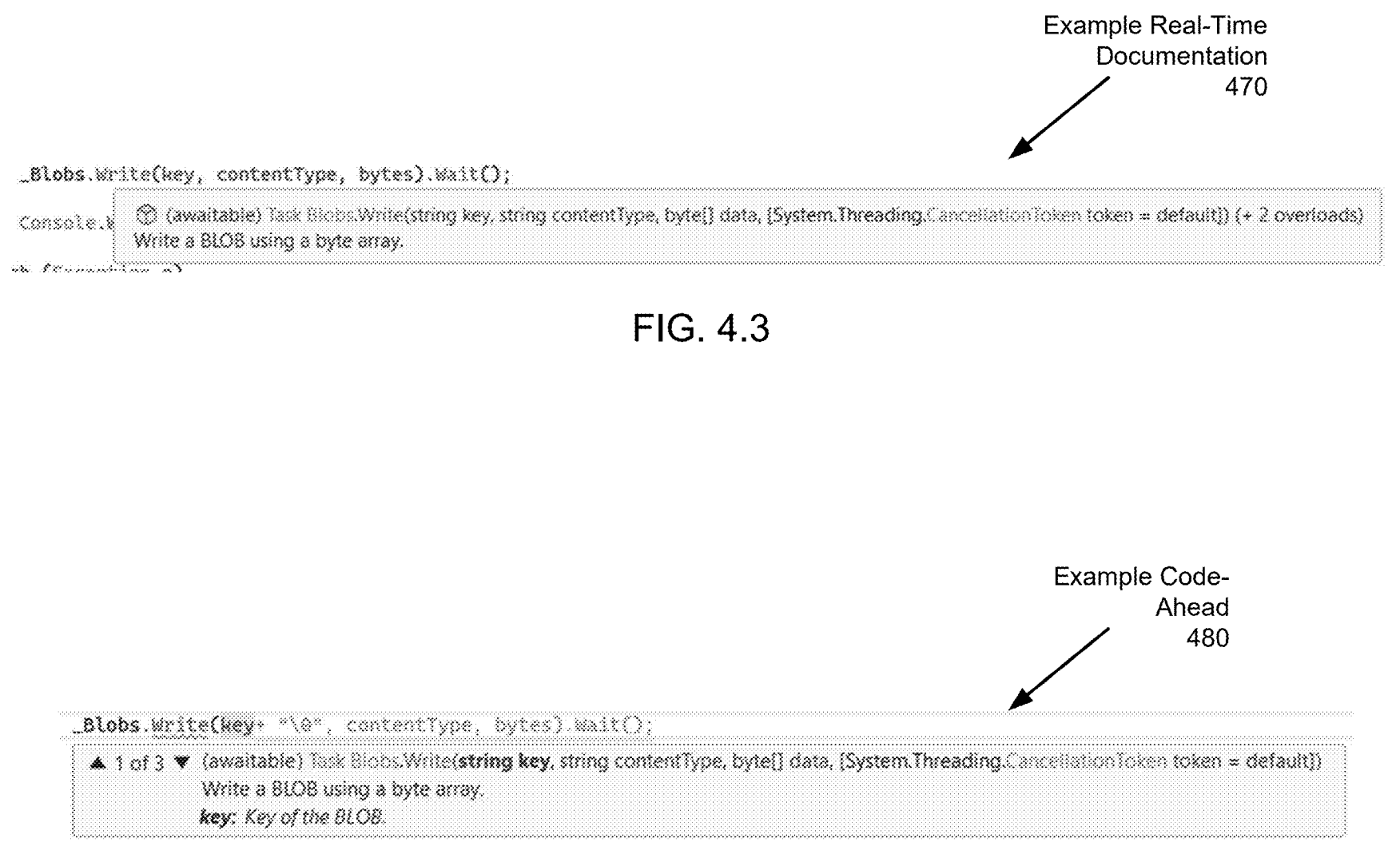

FIG. 4.3 — Example Real-Time Documentation 470

FIG. 4.4 — Example Code-Ahead 480

FUNCTION REGISTRY IN FUNCTION-AS-A-SERVICE ENVIRONMENTS

BACKGROUND

Devices and/or components of devices are often capable of performing certain functionalities that other devices and/or components are not configured to perform and/or are not capable of performing. In such scenarios, it may be desirable to adapt one or more systems to enhance or modify the functionalities of devices and/or components that cannot perform the one or more functionalities. The one or more systems may be adapted using computing instructions executed by the one or more systems.

SUMMARY

In general, in one aspect, the embodiments disclosed herein relate to a method performed to manage a function registry. The method includes obtaining, by a function-as-a-service (FaaS) function registry manager of a FaaS environment, a user query parameter from a first client, wherein the FaaS environment comprises a FaaS function registry; in response to the obtaining: comparing the user query parameter with metadata parameters of the FaaS function registry; identifying at least a first function in the FaaS function registry with metadata parameters that match the user query parameter; and providing a first function image and first function metadata associated with the at least the first function to the client, wherein the client performs code-ahead and real-time documentation using the first function image and the first function metadata.

In general, in one aspect, the embodiments described herein relate to a non-transitory computer readable medium which includes computer readable program code, which when executed by a computer processor enables the computer processor to perform a method for managing a function registry. The method includes obtaining, by a function-as-a-service (FaaS) function registry manager of a FaaS environment, a user query parameter from a first client, wherein the FaaS environment comprises a FaaS function registry; in response to the obtaining: comparing the user query parameter with metadata parameters of the FaaS function registry; identifying at least a first function in the FaaS function registry with metadata parameters that match the user query parameter; and providing a first function image and first function metadata associated with the at least the first function to the client, wherein the client performs code-ahead and real-time documentation using the first function image and the first function metadata.

In general, in one aspect, embodiments described herein relate to a system for managing a function registry. The system includes a client operatively connected to a Function-as-a-service (FaaS) environment and a FaaS function registry manager that includes a processor and memory that is configured to perform a method. The method includes obtaining a user query parameter from a first client of the clients, wherein the FaaS environment comprises a FaaS function registry; in response to the obtaining: comparing the user query parameter with metadata parameters of the FaaS function registry; identifying at least a first function in the FaaS function registry with metadata parameters that match the user query parameter; and providing a first function image and first function metadata associated with the at least the first function to the first client, wherein the first client performs code-ahead and real-time documentation using the first function image and the first function metadata.

Other aspects of the embodiments disclosed herein will be apparent from the following description and the appended claims.

BRIEF DESCRIPTION OF DRAWINGS

Certain embodiments disclosed herein will be described with reference to the accompanying drawings. However, the accompanying drawings illustrate only certain aspects or implementations of the embodiments disclosed herein by way of example, and are not meant to limit the scope of the claims.

FIG. 1.1 shows a diagram of a system in accordance with one or more embodiments of disclosed herein.

FIG. 1.2 shows a diagram of a client in accordance with one or more embodiments disclosed herein.

FIG. 1.3 shows a diagram of a function-as-a-service environment in accordance with one or more embodiments disclosed herein.

FIG. 2.1 shows a diagram of a function-as-a-service registry in accordance with one or more embodiments disclosed herein.

FIG. 2.2 shows a diagram of function metadata in accordance with one or more embodiments disclosed herein.

FIG. 3.1 shows a flowchart of a method for managing a function-as-a-service registry in accordance with one or more embodiments disclosed herein.

FIG. 3.2 shows a flowchart of a method for performing a query of a function-as-a-service registry in accordance with one or more embodiments disclosed herein.

FIG. 3.3 shows a flowchart of a method for performing code-ahead and real-time documentation using a function-as-a-service registry in accordance with one or more embodiments disclosed herein.

FIGS. 4.1-4.4 show an example use case in accordance with one or more embodiments disclosed herein.

DETAILED DESCRIPTION

Figure 5:
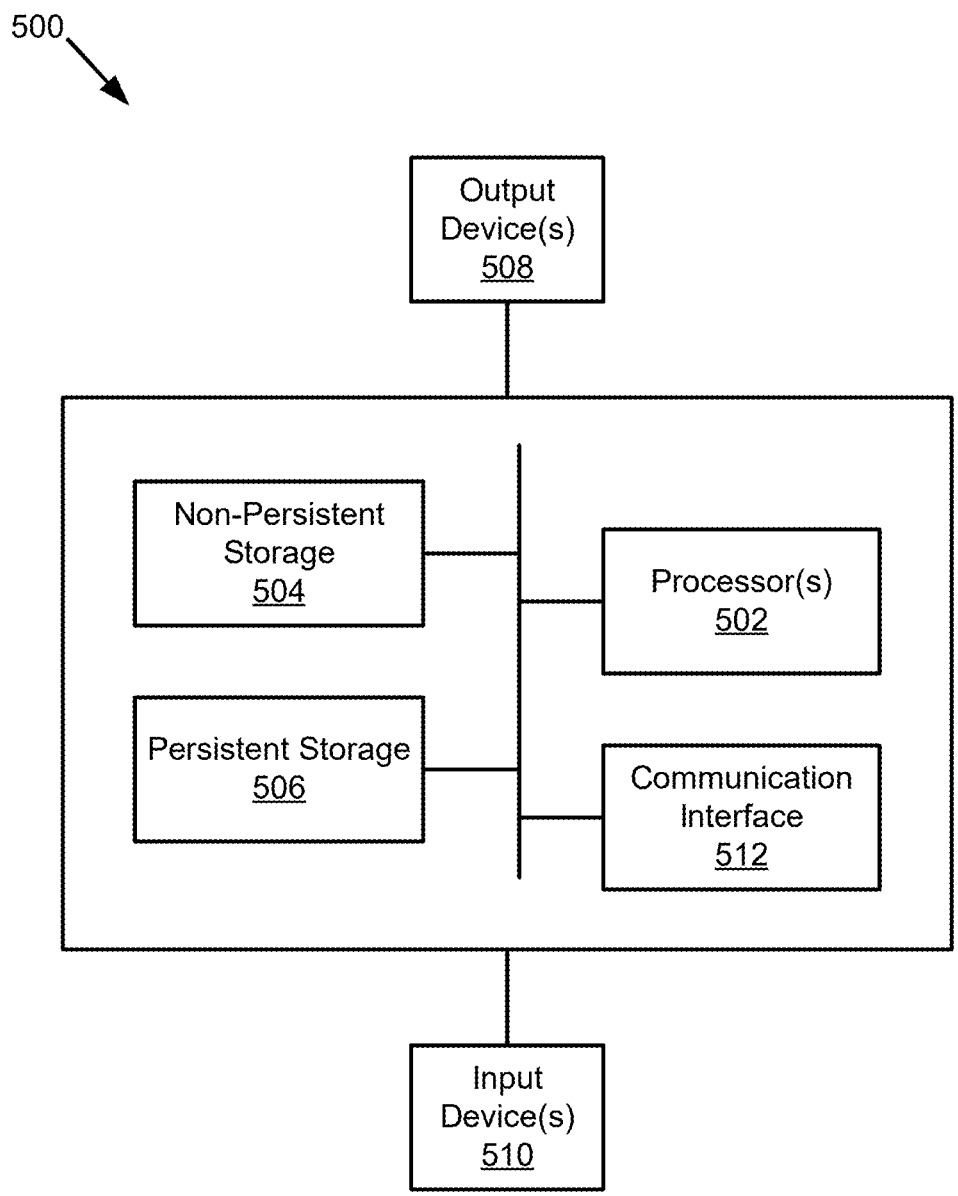
FIG. 5 shows a diagram of a computing device in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, container platforms have registries which enable developers to upload, download, share, and query container images. The persisted artifact may be an image, an environment snapshot capable of being executed on a container runtime such as Docker Engine or containerd. Traditional Function-as-a-service (FaaS) environments may have bespoke repositories for providing similar capabilities in FaaS environments, generally mapping a function and its metadata to a given container which is able to be invoked.

However, using an existing embodiment such as a container registry for functions in a FaaS deployment may not surface useful metadata that enables auto discovery of functions in a FaaS environment. Furthermore, there may be no standardized methods of discovering functions, their runtime, their trigger definitions, and their exception cases that exist as existing embodiments are often platform specific and require specific knowledge and configurations of the platforms. This may lead to complexity and manual intervention when publishing functions and create difficulty in informing developers on their ability to leverage those functions. Moreover, while integrated development environment (IDE) platforms may provide code-ahead and integrated documentation capabilities for native libraries, external packages, and some external services, this metadata may be provided statically rather than dynamically retrieved in real-time to inform the IDE, thus limiting the development capabilities of functions specific IDE versions and packages.

To address, at least in part, the aforementioned issues discussed above, embodiments disclosed herein relate to systems, methods, and/or non-transitory computer readable mediums that implement FaaS function registry that may maintain metadata about invokable functions included in the FaaS function registry (e.g., function name, function identifiers, function runtime, function triggers, function exception cases, etc.). Additionally, a user through a client may be able to define a function, its runtime, its code (body), its exception cases, its trigger, and other metadata (e.g., key-value pairs assigned by the developer), and persist these function parameters in the FaaS registry and otherwise query the FaaS function registry based on those parameters. Moreover, a user, through APIs exposed by the FaaS function registry, may understand what functions are available, how they are consumed, what error conditions may be encountered, and how to invoke them (e.g., via trigger definitions). Finally, integrated development environments (IDEs) may consume the aforementioned APIs for the purposes of exposing functions as class instances and methods that can be used within their language of choice, along with enabling code-ahead and real-time documentation.

As a result, embodiments disclosed herein may provide a centralized and standardized repository of functions with function metadata integrated into a FaaS environment, thus standardizing and democratizing the descriptors used to define functions. Additionally, functions may be queried in the FaaS function registry to identify candidate functions to use based on any of the function metadata attributes included in the FaaS function registry. Furthermore, the FaaS function registry may be queried by a developer's IDE to enable code-ahead and real-time documentation for the function itself and any associated classes or methods. Thus, through the use of the FaaS function registry and integrated FaaS environment, the efficiency, flexibility, and complexity associated with developing functions may be greatly improved.

The following describes various embodiments disclosed herein.

FIG. 1.1 shows a diagram of a system in accordance with one or more embodiments disclosed herein. The system includes any number of clients (100) (e.g., Client A (100A), Client B (100B), etc.), a function-as-a-service (FaaS) environment (120), and a network (130). The system may facilitate, at least, the use, management, and implementation of a FaaS function registry maintained in the FaaS environment (120). The system may include additional, fewer, and/or different components without departing from the scope of the embodiments disclosed herein. Each component may be operably/operatively connected to any of the other components via any combination of wired and/or wireless connections. Each component illustrated in FIG. 1.1 is discussed below.

In one or more embodiments, the clients (100) each may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the clients (100) described herein and/or all, or a portion, of the methods illustrated in FIG. 2. The clients (100) may be implemented using other types of computing devices without departing from the embodiments disclosed herein. For additional details regarding computing devices, refer to FIG. 5.

The clients (100) may be implemented using logical devices without departing from the embodiments disclosed herein. For example, the clients (100) may include virtual machines that utilize computing resources of any number of physical computing devices to provide the functionality of the clients (100). The clients (100) may be implemented using other types of logical devices without departing from the embodiments disclosed herein.

In one or more embodiments, the clients (100) may include the functionality to, or otherwise be programmed or configured to, perform local function development services in conjunction with a user (e.g., a software developer). Additionally, the clients (100) may also include the functionality to obtain FaaS function registry services from the FaaS environment (120). As such, the clients (100) may enable users to develop functions locally on the client with access to the information included in the FaaS function registry. The clients (100) may enable users to obtain functions and/or function metadata from the FaaS function registry to aid in the development of local functions. Additionally, the clients (100) may provide local functions generated by users to the FaaS environment (120) for execution or to be stored in the FaaS function registry so that they or other users of other clients may be able to obtain and use the functions stored in the FaaS function registry in the future.

In addition, the clients (100) may also include the functionality to perform other computer implemented services. The other computer implemented services may include electronic mail communication services, database services, calendar services, inferencing services, and/or word processing services. The computer implemented services may include other and/or additional types of services without departing from embodiments disclosed herein. The clients (100) may include the functionality to perform all, or a portion of, the methods discussed in FIGS. 3.1-3.3. The clients (100) may include other and/or additional functionalities without departing from embodiments disclosed herein.

As being a physical or logical computing device, a client (e.g., 100A, 100B, 100N, etc.) may oversee FaaS environment (120) operations and issue workload requests or other communications (which are actually initiated by users). To this end, to provide services to the users, a client may utilize, rely on, or otherwise cooperate with the FaaS environment (e.g., by interfacing with one or more nodes (e.g., 122A) or a FaaS function registry manager (126, FIG. 1.3) via the FaaS environment interface (e.g., 104, FIG. 1.2)). For example, a client may issue a request (e.g., a request to configure the FaaS environment (120) via a master node (e.g., 104A), a function query request, a FaaS function registry update request, a workload request to implement user-defined workloads via one or more functions on the FaaS environment (120), etc.) to the FaaS environment (120) to receive responses and interact with various components of the FaaS environment (120). A client (e.g., 100A, 100B, 100N, etc.) may also request data from and/or send data to the FaaS environment (120) that allows a node of the FaaS environment (120) to perform computations, the results of which are used by the clients to provide services to the users).

In one or more embodiments, a client (e.g., 100A, 100B, 100N, etc.) may be capable of, e.g.: (i) collecting users' inputs, (ii) correlating collected users' inputs to the computer-implemented services to be provided to the users, (iii) communicating with the FaaS environment (120) that performs computations necessary to provide the computer-implemented services, (iv) using the computations performed by the FaaS environment (120) to provide the computer-implemented services in a manner that appears (to the users) to be performed locally to the users, and/or (v) communicating with any virtual desktop (VD) in a virtual desktop infrastructure (VDI) environment (or a virtualized architecture) provided by the FaaS environment (120) (using any known protocol in the art), for example, to exchange remote desktop traffic or any other regular protocol traffic (so that, once authenticated, users may remotely access independent VDs). One of ordinary skill will appreciate that a client may perform other functionalities without departing from the scope of the embodiments disclosed herein.

In one or more embodiment, a VDI environment (or a virtualized architecture) may be employed for numerous reasons, for example (but not limited to): to manage resource (or computing resource) utilization, to provide cost-effective scalability across multiple servers, to provide a workload portability across multiple servers, to streamline an application development by certifying to a common virtual interface rather than multiple implementations of physical hardware, to encapsulate complex configurations into a file that is easily replicated and provisioned, etc.

For additional information regarding the clients (100), refer to FIG. 1.2.

In one or more embodiments, the FaaS environment (120) may be implemented as one or more nodes (discussed below in FIG. 1.3) that may include the functionality to, or otherwise be programmed or configured to, provide FaaS registry services and FaaS services for the clients (100). The FaaS services may include obtaining, executing, and/or managing one or more functions generated by users of the clients (100). Accordingly, the FaaS environment (120) may automatically, or at the request of a user of the clients (100), provision and/or scale computing resources of the FaaS environment (120) to execute functions from the FaaS function registry or obtained from the clients (100). The FaaS services may include other and/or additional services associated with the compilation, execution, and/or management of functions without departing from embodiments disclosed herein. In one or more embodiments, the FaaS function registry services may include maintaining and enabling access to a FaaS function registry hosted by the FaaS environment. The FaaS function registry services may include all, or a portion, of the methods discussed below in FIGS. 3.1-3.3. For additional information regarding the FaaS environment (120), its components, and/or its functionalities, refer to FIG. 1.3 and FIGS. 3.1-3.3.

In one or more embodiments, the FaaS environment (120) may be a distributed system (e.g., a workload execution environment for executing function workloads, a data processing environment for processing data, a cloud computing infrastructure, etc.) and may deliver at least computing power (e.g., real-time network monitoring, server virtualization, function and workload execution, etc.), storage capacity (e.g., data backup), and data protection (e.g., software-defined data protection, disaster recovery, etc.) as a service to users (e.g., end-users) of the clients (e.g., 100A, 100B, 100N etc.). The FaaS environment (120) may also represent a comprehensive middleware layer executing on computing devices (e.g., 500, FIG. 5) that supports virtualized application and storage environments. In one or more embodiments, the FaaS environment (120) may support one or more virtual machine (VM) environments, and may map capacity requirements (e.g., computational load, storage access, etc.) of VMs and supported applications to available resources (e.g., processing resources, storage resources, etc.) managed by the environments. Further, the FaaS environment (120) may be configured for workload placement collaboration and computing resource (e.g., processing, storage/memory, virtualization, networking, etc.) exchange.

In one or more embodiments, the FaaS environment (120) may provide FaaS services, FaaS function registry services, and other computer-implemented services to the users (e.g., through the execution of function-based workloads). To provide the services to the users, the FaaS environment (120) may perform some computations (e.g., data collection, distributed processing of collected data, etc.) remotely (e.g., away from the users' site using the FaaS environment (120)) from the users. By doing so, the users may utilize different computing devices (e.g., 500, FIG. 5) that have different quantities of computing resources (e.g., processing cycles, memory, storage, etc.) while still being afforded a consistent user experience. For example, by performing some computations remotely, the system (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): execution of computing instructions, computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user of a client (described below). The resource may be delivered to the client via, for example (but not limited to): conventional installation, a method for streaming, a VM executing on a remote computing device, execution from a removable storage device connected to the client (such as universal serial bus (USB) device), etc.

As being implemented as a physical computing device or a logical computing device and with the help of the hosted components, the FaaS environment (120) may include functionality to, e.g.: (i) operate as a reliable function orchestration platform (e.g., a platform that executes functions at scale for production workloads, a function lifecycle management platform that manages multi-function workloads and services deployed across the nodes, etc.); (ii) execute batch workloads (e.g., user initiated workloads, containerized workloads, etc.) in a containerized environment; (iii) provide service discovery and load balancing (e.g., the FaaS environment (120) may handle demand spikes and achieve higher utilization of the nodes by managing wasted/idle (hardware or logical) resource capacity across the worker nodes); (iv) perform storage orchestration; (v) perform automatic resource bin packing; (vi) provide secret and configuration management; (vii) execute one or more services at a global scale on, for example, hundreds of nodes; (viii) in order to provide redundancy and failover capabilities (so that a user may execute an application in a more reliable and resilient way), spin up a newer version of the FaaS environment (120) in parallel and switch traffic to the newer FaaS environment (120) once the newer FaaS environment (120) is ready; (ix) operate as a provider agnostic environment (e.g., the FaaS environment (120) (and its components) may operate seamlessly regardless of the underlying cloud provider); (x) let a user to manage applications that are made up of, for example, hundreds of functions and to manage those applications in different deployment environments (e.g., in physical or virtual machines, in cloud environments, in hybrid deployment environments, etc.); (xi) provide software-defined data protection; (xii) provide automated data discovery, protection, management, and recovery operations in on-premises; (xiii) provide data deduplication; (xiv) orchestrate data protection (e.g., centralized data protection, self-service data protection, etc.) through one or more graphical user interfaces (GUIs); (xv) empower data owners (e.g., users of the clients) to perform self-service data backup and restore operations from their native applications; (xvi) ensure compliance and satisfy different types of service level objectives (SLOs); (xvii) enable virtualized and cloud deployments, including automated data discovery, protection, management, and recovery operations for in-cloud workloads; (xviii) simplify VM image backups of a VM with near-zero impact on the VM; (xix) streamline data protection for applications and/or functions; (xx) increase resiliency of an organization by enabling rapid recovery or cloud disaster recovery from cyber incidents; (xxi) provide operational simplicity, agility, and flexibility for physical, virtual, and cloud-native IT environments, (xxii) support an infrastructure that is based on a network of computing and storage resources that enable the delivery of shared applications and data (e.g., a FaaS environment (120) may exchange data with other FaaS environment (120) of the same organization registered in/to the network (130) in order to, for example, participate in a collaborative workload placement); and/or (xxiii) initiate multiple data processing or protection operations in parallel (e.g., in which each of the multiple operations may (a) manage the initiation of a respective operation and (b) operate concurrently to initiate multiple operations).

In one or more embodiments, the FaaS environment (120) may execute one or more workloads to provide the aforementioned FaaS services, FaaS function registry services, and the computer-implemented services. As used herein, a "workload" is a physical or logical component configured (e.g., via functions) to perform certain work functions. Workloads may be instantiated and operated while consuming computing resources allocated thereto. Examples of a workload may include (but not limited to): a data protection workload, a VM, a container, a network-attached storage (NAS), a database, an application, a collection of microservices, a file system (FS), small workloads with lower priority workloads (e.g., FS host data, OS data, etc.), medium workloads with higher priority (e.g., VM with FS data, network data management protocol (NDMP) data, etc.), large workloads with critical priority (e.g., mission critical application data), etc.

As used herein, a "file system" is a method that an OS (e.g., Microsoft® Windows, Apple® MacOS, etc.) uses to control how data is named, stored, and retrieved. For example, once a user has logged into a computing device (e.g., 500, FIG. 5), the OS of that computing device uses the file system (e.g., new technology file system (NTFS), a resilient file system (ReFS), a third extended file system (ext3), etc.) of that computing device to retrieve one or more applications to start performing one or more operations (e.g., functions, tasks, activities, jobs, etc.). As yet another example, a file system may divide a volume (e.g., a logical drive) into a fixed group of bytes to generate one or more blocks of the volume.

For additional information regarding the FaaS environment (120), its components, and/or its functionalities, refer to FIG. 1.3 and FIGS. 3.1-3.3.

Returning to the discussion of FIG. 1.1, in one or more embodiments, the network (130) may represent a (decentralized or distributed) computing network and/or fabric configured for computing resource and/or messages and communications exchange among registered computing devices (e.g., the client (100) and the FaaS environment (120)). As discussed above, components of the system may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the client (100) and the FaaS environment (120) through any number and type of wired and/or wireless network protocols (e.g., TCP, UDP, IPv4, etc.).

As used herein, "communication" may refer to simple data passing, or may refer to two or more components coordinating a job. As used herein, the term "data" is intended to be broad in scope. In this manner, that term embraces, for example (but not limited to): data segments that are produced by data stream segmentation processes, data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

The network (130) may encompass various interconnected, network-enabled subcomponents (not shown) (e.g., switches, routers, gateways, cables etc.) that may facilitate communications between the components of the system. In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of milliseconds or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VOIP), etc.

Although the system of FIG. 1.1 is shown as having a certain number of components (e.g., 100, 120, 130), in other embodiments disclosed herein, the system may have more or fewer components. For example, there may be multiple clients. As another example, the functionality of each component described above may be split across components or combined into a single component. Further still, each component may be utilized multiple times to carry out an iterative operation.

While FIG. 1.1 shows a configuration of components, other system configurations may be used without departing from the scope of the embodiments disclosed herein.

FIG. 1.2 shows a diagram of a client in accordance with one or more embodiments disclosed herein. Client A (100A) may be an embodiment of the clients (100, FIG. 1.1) discussed above. As discussed above, client A (100A) may include the functionality to perform local function development services for a user and obtain FaaS function registry services from the FaaS environment (120, FIG. 1.1). To perform/obtain the aforementioned services, client A (100A) may include a function developer (102), a FaaS interface (104), and storage (106). Client A (100A) may include other, additional, and/or fewer components without departing from embodiments disclosed herein. Each of the aforementioned components of client A (100A) are discussed below.

In one or more embodiments, the function developer (102) may be implemented as one or more physical devices. A physical device may include circuitry. The physical device may be, for example, a field-programmable gate array, application specific integrated circuit, programmable processor, microcontroller, digital signal processor, or other hardware processor. The physical device may be configured to provide the functionality of the function developer (102) described throughout this Detailed Description.

In one or more embodiments, the function developer (102) may be implemented as computer instructions, e.g., computer code, stored on a storage (e.g., 106) that when executed by a processor of client A (100A) causes client A (10A) to provide the functionality of the function developer (102) described throughout this Detailed Description.

In one or more embodiments, the function developer (102) may refer to one or more software programs that include the functionality to enable a user of client A (100A) to develop functions. Developing functions may include writing functions and generating function files (e.g., writing computing code, code documentation, and function metadata associated with the function), compiling functions (e.g., translating the code of functions into a format suitable for execution by a computing device (e.g., client A (100A), a node of the FaaS environment (120, FIG. 1.1), etc.)), debugging functions (e.g., identifying and/or resolving errors or bugs in the function code), executing functions, etc. Developing functions may include other and/or additional services without departing from embodiments disclosed herein. In one or more embodiments, the function developer (102) may be implemented using any appropriate type of code editor, compiler, debugger, code execution monitor, integrated development environment (IDE), and/or software development kit (SDK) without departing from embodiments disclosed herein.

In one or more embodiments, the function developer (102) may also include the functionality to enable interaction with a user of client A (100A). For example, the function developer may generate and maintain a graphical user interface (GUI) that displays information to the user and provides a user with the ability to input information (e.g., by clicking a button with a mouse or touchscreen, inputting information using a keyboard, etc.). Accordingly, users may input information to the function developer (102) to develop functions and obtain FaaS services, FaaS function registry services, and other computer implemented services from the FaaS environment (120, FIG. 1.1). The function developer (102) may include the functionality to perform all, or a portion of, the methods discussed in FIGS. 3.1-3.3 without departing from embodiments disclosed herein. The function developer (102) may include other and/or additional functionalities without departing from embodiments disclosed herein.

In one or more embodiments, the FaaS interface (104) may represent an application programming interface (API) (e.g., a communication channel, an entry point to client A (100A), etc.) for the FaaS environment (120, FIG. 1.1) or other external entities. To that extent, the FaaS interface (104) may employ a set of subroutine definitions, protocols, and/or hardware/software components for enabling communications between client A (100A) and external entities included in the FaaS environment (120, FIG. 1.1) (e.g., the FaaS function registry manager (126, FIG. 1.3), nodes (e.g., 122A, 122B, 122N, etc., FIG. 1.3)). One of ordinary skill will appreciate that the FaaS interface (104) may perform other functionalities without departing from the scope of the embodiments disclosed herein. The FaaS interface (104) may be implemented using hardware, software, or any combination thereof.

In one or more embodiments, the storage (106) may refer to a hardware component that is used to store data in a computing device (e.g., 500, FIG. 5). In one or more embodiments, storage (106) may be a physical computer-readable medium. For example, storage (106) may be (or may include) HDDs, Flash-based storage devices (e.g., solid-state drives (SSDs)), tape drives, FC based storage devices, and/or other physical/logical storage media ((i) logical storage (e.g., virtual disk) may be implemented using one or more physical storage devices whose storage resources (all, or a portion) are allocated for use using a software layer, and (ii) logical storage may include both physical storage devices and an entity executing on a processor (or other hardware device) that allocates the storage resources of the physical storage devices). The storage (106) may be other types of storage not listed above without departing from the scope of the embodiments disclosed herein.

In one or more embodiments, the storage (106) may be configured as a storage array (e.g., a NAS), in which the storage array may refer to a collection of one or more physical storage devices that may consolidate various forms of data. Each physical storage device may include non-transitory computer readable storage media, in which data may be stored in whole or in part, and temporarily or permanently.

In one or more embodiments, the storage (106) may be implemented using one or more volatile or non-volatile storages or any combination thereof. The storage (106) may include the functionality to, or otherwise be configured to, store and provide all, or portions, of information that may be used by client A (100A), the function developer (102), and/or the FaaS interface (104). The information stored in the storage (106) may include a local function registry (108), FaaS function registry information (110), and function developer information (112). The storage (106) may include other and/or additional information without departing from embodiments disclosed herein. Each of the aforementioned types of information is discussed below.

In one or more embodiments, the local function registry (108) may refer to one or more data structures that include information associated with local custom functions developed, or currently being developed, by a user of client A (100A) or derived through modifications made to a function obtained from the FaaS function registry (discussed below) of the FaaS environment (120, FIG. 1.1). The information may include one or more function entries (not shown) associated with local functions. A function entry may include a function image and function metadata (both not shown) associated with the corresponding function. The function image and function metadata may be an embodiment of the function image and function metadata discussed below in FIGS. 2.1-2.2. For additional information regarding a function image and function metadata, refer to FIGS. 2.1-2.2. The local function registry (108) may be generated and/or updated by a user in conjunction with the function developer (102). The local function registry (108) may be used by a user to (i) develop functions, (ii) execute functions on client A (100A), (iii) send functions to the FaaS environment (120, FIG. 1.1) for execution, and/or (iv) to send all, or a portion of, function entries to the FaaS environment (120, FIG. 1.1) to be included in or to update the FaaS function registry. The local function registry (108) may include other and/or additional information and may be used for other and/or additional purposes without departing from embodiments disclosed herein.

In one or more embodiments, the FaaS function registry information (110) may refer to one or more data structures that include information associated with the FaaS function registry of the FaaS environment (120, FIG. 1.1). The information may include entries associated with functions obtained from the FaaS function registry of the FaaS environment (120, FIG. 1.1). An entry may include all, or a portion of, the information included in the FaaS function registry associated the corresponding function (e.g., a function image and/or function metadata). The function image and function metadata may be an embodiment of the function image and function metadata discussed below in FIGS. 2.1-2.2. For additional information regarding a function image and function metadata, refer to FIGS. 2.1-2.2. The FaaS function registry information (110) may be used by a user to (i) develop functions, (ii) execute functions on client A (100A), (iii) send functions to the FaaS environment (120, FIG. 1.1) for execution, and/or (iv) to send all, or a portion of, function entries to the FaaS environment (120, FIG. 1.1) to be included in or to update the FaaS function registry. The FaaS function registry information (110) may be generated by the user of client A (100A) and/or other users of other clients (e.g., client B (100B), client N (100N), etc., FIG. 1.1).

Additionally, the FaaS function registry information (110) may include communication and authentication information associated with the FaaS function registry and the FaaS environment (120, FIG. 1.1) that enables client A (100A) to interact with the FaaS environment through the FaaS interface (104). The communication and authentication information may include, for example, one or more network addresses, port numbers, usernames and passwords, encryption methods, encryption keys, etc. The communication and authentication information may include other and/or additional information associated with communication and authentication with the FaaS environment without departing from embodiments disclosed herein. The communication and authentication information may be generated by the user of client A (100A), other users of other clients (e.g., client B (100B), client N (100N), etc., FIG. 1.1), a system administrator, the clients (e.g., 100A, 100B, 100N, etc., FIG. 1.1), and/or the FaaS environment (120, FIG. 1.1). The FaaS function registry information (110) may include other and/or additional information and may be used for other and/or additional purposes without departing from embodiments disclosed herein.

While the data structures (e.g., 108, 110) and other data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (106), any of the aforementioned data structures may be stored in different locations (e.g., in storage of other computing devices) and/or spanned across any number of computing devices without departing from embodiments disclosed herein. The data structures discussed in this Detailed Description may be implemented using, for example, file systems, lists, linked lists, tables, unstructured data, databases, etc.

While FIG. 1.2 shows a configuration of components, other configurations may be used without departing from the scope of the embodiments disclosed herein.

FIG. 1.3 shows a diagram of a Function-as-a-service (FaaS) environment in accordance with one or more embodiments disclosed herein. The FaaS environment (120) may be an embodiment of the FaaS environment (120, FIG. 1.1) discussed above. As discussed above, the FaaS environment (120) may include the functionality to perform FaaS services and FaaS function registry services for clients (100, FIG. 1.1). To perform the aforementioned services, the FaaS environment (120) may include one or more nodes (e.g., 122A, 122B, 122N, etc.), a FaaS function registry (124), a FaaS function registry manager (126), and a client interface (128). The FaaS environment (120) may include other, additional, and/or fewer components without departing from embodiments disclosed herein. Each of the aforementioned components of the FaaS environment (120) are discussed below.

In one or more embodiments, a node (e.g., 122A, 122B, 122N, etc.) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the node described throughout this application.

In one or more embodiments, a node (122A, 122B, 122N, etc.) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data (e.g., information, intelligence, etc.) for business, management, entertainment, or other purposes. For example, a node (e.g., 122A, 122B, 122N, etc.) may be a personal computer (e.g., a desktop computer, a laptop computer, a mobile computer, a note-book computer, etc.), a personal digital assistant (PDA), a smart phone, a tablet device (or any other a consumer electronic device), a network storage device, a network server, a switch, a router (or any other network communication device), or any other suitable device, and may vary in size, shape, performance, functionality, and price.

Alternatively, in one or more embodiments, the node (e.g., 122A, 122B, 122N, etc.) may be implemented as a logical device. The logical device may utilize the computing resources of any number of computing devices to provide the functionality of the node described throughout this application.

In one or more embodiments, as being a physical computing device or a logical computing device, a node (e.g., 122A, 122B, 122N, etc.) may be configured for, e.g.: (i) hosting and maintaining various function workloads, (ii) providing a computing environment (e.g., computing power and storage) whereon workloads may be implemented, (iii) providing computer-implemented services (e.g., receiving a request, sending a response to the request, database services, electronic communication services, data protection services, etc.) to one or more entities (e.g., users, components of the system discussed in FIG. 1.1, etc.), (iv) exchanging data with other components registered in/to the network (130) in order to, for example, participate in a collaborative workload placement, and/or (v) operating as a standalone device. In one or more embodiments, in order to read, write, or store data, a node (e.g., 122A, 122B, 122N, etc.) may communicate with, for example, clients (e.g., 120A, 120N) through the client interface (128), other nod (e.g., 122A, 122B, 122N, etc.), and/or other entities/components (e.g., a backup storage system).

Further, while a single node is considered above, the term "system" includes any collection of systems or sub-systems that individually or jointly execute a set, or multiple sets, of instructions to provide one or more computer-implemented services. For example, a single node may provide a computer-implemented service on its own (i.e., independently) while multiple other nodes may provide a second computer-implemented service cooperatively (e.g., each of the multiple other nodes may provide similar and/or different services that form the cooperatively provided service).

In one or more embodiments, the instructions may embody one or more functions, which when executed by a node, causes the node to perform computer implemented services. A function may refer to a block of reusable (e.g., callable), organized, and self-contained computer code that may be executed by a computing device, or a component therein, as part of a computer program (e.g., an application) that causes the computing device to perform a single action or set of related actions. In a particular embodiment, the instructions may reside completely, or at least partially, within a storage/memory resource a node, and/or within a processor during execution by the node.

To provide any quantity and any type of computer-implemented services, a node (e.g., 122A, 122B, 122N, etc.) may utilize computing resources provided by various hardware components and/or logical components (e.g., virtualization resources). In one or more embodiments, a computing resource (e.g., a measurable quantity of a compute-relevant resource type that may be requested, allocated, and/or consumed) may be (or may include), for example (but not limited to): a central processing unit (CPU), a graphics processing unit (GPU), a data processing unit (DPU), a memory resource, a network resource, storage space/source (e.g., to store any type and quantity of information), storage I/O, a hardware resource set, a compute resource set (e.g., one or more processors, processor dedicated memory, etc.), a control resource set, etc. In one or more embodiments, computing resources of a node (e.g., 122A, 122B, 122N, etc.) may be divided into three logical resource sets: a compute resource set, a control resource set, and a hardware resource set. Different resource sets, or portions thereof, from the same or different nodes may be aggregated (e.g., caused to operate as a computing device) to instantiate, for example, a composed node having at least one resource set from each set of the three resource set model.

In one or more embodiments, a CPU may refer to an electronic circuitry that may execute operations and/or instructions (i.e., computer-readable program code and/or machine byte-code) specified by an application. More specifically, a CPU may perform an operation in three steps: (i) fetching instructions related to the operation from memory, (ii) analyzing the fetched instructions, and (iii) performing the operation based on the analysis. In one or more embodiments, the operation may be, for example (but not limited to): a basic arithmetic calculation, comparing numbers, performing a function, displaying a video, etc.

In one or more embodiments, as a central processing virtualization platform, a virtual CPU (vCPU) implementation may be provided to one or more pods (e.g., 154A, FIG. 1.3), in which the vCPU implementation may enable the pods to have direct access to a single physical CPU. More specifically, the vCPU implementation may provide computing capabilities by sharing a single physical CPU among pods.

In one or more embodiments, a GPU may refer to an electronic circuitry that may provide parallel data processing capabilities to generate enhanced, real-time graphics and to perform accelerated computing tasks (which is particularly useful for machine learning (ML) related operations). In one or more embodiments, a GPU may include, for example (but not limited to): a graphics memory controller, a video processing engine (that is configured to or capable of rendering frames at a particular frame rate (and in some cases, configured to or capable of encoding frames at a particular frame rate)), a graphics and computation engine, etc.

In one or more embodiments, as a graphics virtualization platform, a virtual GPU (vGPU) implementation may be provided to one or more pods (e.g., 154A, FIG. 1.3), in which the vGPU implementation may enable the pods to have direct access to a single physical GPU. More specifically, the vGPU implementation may provide parallel data processing and accelerated computing capabilities by sharing a single physical GPU among pods.

In one or more embodiments, a DPU may refer to an electronic circuitry that may perform accelerated data processing and optimized data movement within the FaaS environment (120). In one or more embodiments, a DPU may include, for example (but not limited to): a high-speed networking interface (e.g., 200 gigabits per second (200 Gb/s)), dynamic RAM (DRAM), multi-core (e.g., 8-core) CPU, programmable acceleration engines (particularly for ML, security, and telecommunications purposes), etc.

In one or more embodiments, as a data processing virtualization platform, a virtual DPU (vDPU) implementation may be provided to one or more pods (e.g., 154A, FIG. 1.3), in which the vDPU implementation may enable the pods to have direct access to a single physical DPU. More specifically, the vDPU implementation may provide full data center-on-chip programmability, and high-performance networking and computing capabilities by sharing a single physical DPU among pods.

In one or more embodiments, a memory resource may be any hardware component that is used to store data in a computing device (e.g., 500, FIG. 5). The data stored in a memory resource may be accessed almost instantly (e.g., in milliseconds (ms)) regardless of where the data is stored in the memory resource. In most cases, a memory resource may provide the aforementioned instant data access because the memory resource may be directly connected to a CPU on a wide and fast bus connection (e.g., a high-speed internal connection that transfers data between the hardware components of a computing device).

In one or more embodiments, a memory resource may be (or may include), for example (but not limited to): DRAM (e.g., DDR4 DRAM, error correcting code (ECC) DRAM, etc.), persistent memory (PMEM) (e.g., (i) physical computer memory, for data storage, that includes both storage and memory attributes; (ii) byte-addressable like memory that is capable of providing byte-level access of data to applications and/or other logical components; etc.), Flash memory, etc. In one or more embodiments, DRAM may be volatile, which may mean DRAM only stores data as long as it is being supplied with power. Additionally, PMEM and Flash memory may be non-volatile, in which they may store data even after a power supply is removed.

In one or more embodiments, a network resource (or simply "network") may refer to (i) a computer network including two or more computers that are connected any combination of wired and/or wireless connections and/or (ii) for example, a network interface card (NIC) and a network adapter, which may be may be specified in base units of bits per second (bps). The computer network may be generated using hardware components (e.g., routers, access points, cables, switches, etc.) and software components (e.g., OSs, business applications, etc.). In one or more embodiments, geographic location may define a computer network. For example, a local area network (LAN) may connect computing devices in a defined physical space (e.g., in an office building), whereas a wide area network (WAN) (e.g., Internet) may connect computing devices across continents. In one or more embodiments, the computer network may be defined based on network protocols (e.g., TCP, UDP, IPv4, etc.).

In one or more embodiments, storage space (or simply "storage") may refer to a hardware component that is used to store data in a computing device (e.g., 500, FIG. 5). In one or more embodiments, storage may be a physical computer-readable medium. For example, storage may be (or may include) HDDs, Flash-based storage devices (e.g., solid-state drives (SSDs)), tape drives, FC based storage devices, and/or other physical/logical storage media ((i) logical storage (e.g., virtual disk) may be implemented using one or more physical storage devices whose storage resources (all, or a portion) are allocated for use using a software layer, and (ii) logical storage may include both physical storage devices and an entity executing on a processor (or other hardware device) that allocates the storage resources of the physical storage devices). Storage may be other types of storage not listed above without departing from the scope of the disclosed herein.

In one or more embodiments, storage may be configured as a storage array (e.g., a NAS), in which the storage array may refer to a collection of one or more physical storage devices that may consolidate various forms of data. Each physical storage device may include non-transitory computer readable storage media, in which data may be stored in whole or in part, and temporarily or permanently.

In one or more embodiments, a hardware resource set (e.g., of a node) may include (or specify), for example (but not limited to): a configurable CPU option (e.g., a valid/legitimate vCPU count per-pod option), a configurable network resource option (e.g., enabling/disabling single-root input/output virtualization (SR-IOV) for specific pods), a configurable memory option (e.g., maximum and minimum memory per-pod), a configurable GPU option (e.g., allowable scheduling policy and/or vGPU count combinations per-pod), a configurable DPU option (e.g., legitimacy of disabling inter-integrated circuit (I2C) for various pods), a configurable storage space option (e.g., a list of disk cloning technologies across all pods), a configurable storage I/O option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency quality of service (QOS) template, a 10 GB/s BW with 10 ms latency QoS template, etc.), a DPU related template (e.g., a 1 GB/s BW vDPU with 1 GB vDPU frame buffer template, a 2 GB/s BW vDPU with 1 GB vDPU frame buffer template, etc.), a GPU related template (e.g., a depth-first vGPU with 1 GB vGPU frame buffer template, a depth-first vGPU with 2 GB vGPU frame buffer template, etc.), a storage space related template (e.g., a 40 GB SSD storage template, an 80 GB SSD storage template, etc.), a CPU related template (e.g., a 1 vCPU with 4 cores template, a 2 vCPUs with 4 cores template, etc.), a memory resource related template (e.g., a 4 GB DRAM template, an 8 GB DRAM template, etc.), a vCPU count per-pod, a virtual NIC (vNIC) count per-pod, a wake on LAN support configuration (e.g., supported/enabled, not supported/disabled, etc.), a swap space configuration per-pod, a vGPU count per-pod, a type of a vGPU scheduling policy (e.g., a "fixed share" vGPU scheduling policy, an "equal share" vGPU scheduling policy, etc.), a type of a GPU virtualization approach, a storage mode configuration (e.g., an enabled high-performance storage array mode, a disabled high-performance storage array mode, etc.), a file system block size, a backup frequency (e.g., hourly, daily, monthly, etc.), etc.

In one or more embodiments, a control resource set (e.g., of a node) may facilitate formation of, for example, a composed node within the FaaS environment (120). To do so, a control resource set may prepare any quantity of computing resources from any number of hardware resource sets (e.g., of the corresponding node and/or other nodes) for presentation. Once prepared, the control resource set may present the prepared computing resources as bare metal resources to a composer (not shown) of the FaaS environment (120). By doing so, a composed node may be instantiated.

To prepare the computing resources of the hardware resource sets for presentation, the control resource set may employ, for example, virtualization, indirection, abstraction, and/or emulation. These management functionalities may be transparent to applications hosted by the instantiated/composed node. Consequently, while unknown to components of a composed node, the composed node may operate in accordance with any number of management models thereby providing for unified control and management of the composed node.

In one or more embodiments, the composer may implement a management model to manage computing resources (e.g., computing resources provided by one or more hardware/software devices of nodes (e.g., 122A, 122B, 122N, etc.) in a particular manner. The management model may give rise to additional functionalities for the computing resources. For example, the management model may be automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and numbers of management models may be implemented to provide additional functionalities using the computing resources without departing from the scope of the embodiments disclosed herein.

In one or more embodiments, in conjunction with the composer, a system control processor (not shown) of a corresponding node may cooperatively enable hardware resource sets of other nodes to be prepared and presented as bare metal resources to a composed node. In one or more embodiments, a compute resource set, a control resource set, and/or a hardware resource set may be implemented as separate physical devices. In such a scenario, any of these resource sets may include NICs or other devices to enable the hardware devices of the respective resource sets to communicate with each other.

One of ordinary skill will appreciate that the composer may perform other functionalities without departing from the scope of the embodiments disclosed herein. The composer may be implemented using hardware (i.e., circuitry), software, or any combination thereof.

In one or more embodiments, a node (e.g., 104A, 106A, etc.) may split up a request (e.g., an operation, a task, an activity, etc.) with another component of the system of FIG. 1.1, coordinating its efforts to complete the request more efficiently than if the node had been responsible for completing the request. A request may be, for example (but not limited to): a web browser search request, a representational state transfer (REST) request, a computing request, a database management request, a registration request, a file upload/download request, etc. To provide computer-implemented services to one or more entities, a node may perform computations locally and/or remotely. By doing so, the node may utilize different computing devices (e.g., 500, FIG. 5) that have different quantities of computing resources to provide a consistent experience to the entities. In one or more embodiments, a node may be a heterogeneous set, including different types of hardware components and/or different types of OSs.

In one or more embodiments, a node (e.g., 122A, 122B, 122N, etc.) may host any number of applications (and/or content accessible through the applications) that provide application services to the clients (e.g., 100A, 100B, 100N, FIG. 1.1). The applications may be executed by calling and executing one or more functions associated with the applications. Application services may include, for example (but not limited to): instant messaging services, file storage services, web-based services, desktop-based services, workload placement collaboration services, serving (e.g., processing) a request, sharing an application log, receiving computing resource details of a node, transmitting a request, analyzing data, streaming video, etc. In order to provide any application services, each application may host similar or different components. The components may be, for example (but not limited to): instances of databases, instances of email servers, etc.

Further, applications may vary in different embodiments, but in certain embodiments, applications may be (i) custom developed (e.g., using one or more local functions generated by a user or by modifying functions obtained from the FaaS function registry (124)) or (ii) generic (e.g., off-the-shelf using functions obtained from the FaaS function registry (124) without modification) applications that a user desires to execute in a node (e.g., 122A, 122B, 122N, etc.). In one or more embodiments, applications may be logical entities comprised of one or more functions executed using computing resources of a node. For example, applications may be implemented as multiple functions (e.g., computer instructions, e.g., computer code) stored on persistent storage of a node that when executed by the processor(s) of the node, cause the node to provide the functionality of the applications described throughout the application.

In one or more embodiments, while performing, for example, one or more operations requested by a user of a client (e.g., 100A, 100B, 100N, etc.), applications installed on a node (e.g., 122A, 122B, 122N, etc.) may include functionality to request and use resources (e.g., data, metadata, computing resources, etc.) of the node. Applications may also perform other types of functionalities not listed above without departing from the scope of the embodiments disclosed herein. In one or more embodiments, while providing application services to a user, applications may store (temporarily or permanently) data that may be relevant to the user in persistent storage of the node.

In one or more embodiments, in order to provide the above-mentioned functionalities, a node (e.g., 122A, 122B, 122N, etc.) may need to communicate with other components of the system with minimum amount of latency (e.g., with high-throughput (e.g., a high data transfer rate) and sub-ms latency). For this reason, REST application programming interfaces (REST APIs) may be used to enable communication(s) between the node and other components.

As discussed above, a node (e.g., 104A, 106A, etc.) may provide any quantity and type of computer-implemented services (e.g., to a user upon request). To provide the computer-implemented services, resources of the node (discussed above) may be used to instantiate a composed node (within the FaaS environment (120)). The composed node may also provide any quantity and type of computer-implemented services (e.g., to a user upon request).

While a node (e.g., 122A, 122B, 122N, etc.) has been illustrated and described as including a limited number of specific components and/or hardware resources, the node may include additional, fewer, and/or different components without departing from the scope of the embodiments disclosed herein. One of ordinary skill will appreciate that a node (e.g., 122A, 122B, 122N, etc.) may perform other functionalities without departing from the scope of the embodiments disclosed herein.

In one or more embodiments, the FaaS function registry (124) may be implemented as computer instructions, e.g., computer code, stored on a storage of one or more nodes (e.g., 122A, 122B, 122N, etc.) that when executed by a processor of the one or more nodes (e.g., 122A, 122B, 122N, etc.) causes the nodes (e.g., 122A, 122B, 122N, etc.) to provide the functionality of the FaaS function registry (124) described throughout this Detailed Description.

In alternative embodiments, the FaaS function registry (124) may be implemented using hardware, software, or any combination thereof.

In one or more embodiments, the FaaS function registry (124) may represent a storage service dedicated to consolidating functions (e.g., function images and function metadata). The FaaS function registry (124) may include the functionality to store functions generated by and/or obtained from clients (100, FIG. 1.1) (via the users of the clients) in storage (not shown) of one or more nodes (e.g., 122A, 122B, 122N, etc.). The FaaS function registry (124) may also be used to provide functions and/or function metadata to clients (100, FIG. 1.1) for function development. Additionally, the FaaS function registry (124) may also provide functions to the nodes (e.g., 122A, 122B, 122N, etc.) to execute as applications or other programs to provide computer implemented services for the clients (100, FIG. 1.1). The functions may be collated and packaged together as a container image and provided to the nodes for execution. The FaaS function registry (124) may include other and/or additional functionalities without departing from embodiments disclosed herein.

In one or more embodiments, a container image may represent a foundation snapshot (e.g., a template), for a given workload or application type, from which deployed workloads, sought to be implemented, may be based. For example, should a data backup workload be deployed onto the FaaS environment (120), a data backup container image that includes one or more function images associated with functions for performing a data backup may be retrieved from the collated from the FaaS function registry (124) and used as a template for implementing a containerized environment (e.g., a container) where a data backup application may execute. Accordingly, a container image may include all that which may be necessary to implement any given workload, such as relevant functions and dependencies (e.g., system tools, system libraries, settings, etc.).

For additional information regarding the contents of the FaaS function registry (124), refer to FIGS. 2.1-2.2.

In one or more embodiments, the FaaS function registry manager (126) may be implemented as computer instructions, e.g., computer code, stored on a storage of one or more nodes (e.g., 122A, 122B, 122N, etc.) that when executed by a processor of the one or more nodes (e.g., 122A, 122B, 122N, etc.) causes the nodes (e.g., 122A, 122B, 122N, etc.) to provide the functionality of the FaaS function registry manager (126) described throughout this Detailed Description.

In alternative embodiments, the FaaS function registry manager (126) may be implemented using hardware, software, or any combination thereof.

In one or more embodiments, the FaaS function registry manager (126) may include the functionality to perform function registry management services for the FaaS function registry (124). The function registry management services may include: (i) updating the FaaS function registry (124) based on requests obtained from users of clients (100, FIG. 1.1), (ii) querying the FaaS function registry based on user input parameters obtained from users of clients (100, FIG. 1.1), and (iii) providing FaaS function registry information to the users of clients (100, FIG. 1.1) based on the query results. The function registry management services may include other and/or additional services associated with the management of the FaaS function registry (124) without departing from embodiments disclosed herein. The FaaS function registry manager (126) may include the functionality to perform all, or a portion of, the methods discussed in FIGS. 3.1-3.3. The FaaS function registry manager (126) may include other and/or additional functionalities without departing from embodiments disclosed herein.

In one or more embodiments disclosed herein, the client interface (128) may represent an application programming interface (API) (e.g., a communication channel, an entry point to the FaaS environment (120), etc.) for the clients (100, FIG. 1.1). To that extent, the client interface (128) may employ a set of subroutine definitions, protocols, and/or hardware/software components for enabling communications between the clients (100, FIG. 1.1) and external entities included in the FaaS environment (120) (e.g., the FaaS function registry manager (126), nodes (e.g., 122A, 122B, 122N, etc.)). One of ordinary skill will appreciate that the client interface (128) may perform other functionalities without departing from the scope of the embodiments disclosed herein. The client interface (128) may be implemented using hardware, software, or any combination thereof.

Turning now to FIG. 2.1, FIG. 2.1 shows a diagram of a Function-as-a-service (FaaS) function registry in accordance with one or more embodiments disclosed herein. The FaaS function registry (200) may be an embodiment of the FaaS function registry (124, FIG. 1.3) discussed above. As discussed above, the FaaS function registry (200) may include the functionality to consolidate and maintain functions and information associated with functions developed by various users of various clients (e.g., 100A, 100B, 100N, FIG. 1.1) and to provide all, or a portion, of the information associated with the functions to clients (e.g., 100A, 100B, 100N, FIG. 1.1) and/or nodes of the FaaS environment (120, FIG. 1.1) to be used to develop other functions or for execution of applications or other workloads using the functions. As such, the FaaS function registry (200) may include any quantity of function entries without departing from embodiments disclosed herein. The function entries may include, for example, function A entry (202A), function B entry (202B), function N entry (202N), etc. Each function entry (e.g., 202A, 202B, 202N, etc.) may be associated with a single function. Each function entry (e.g., 202A, 202B, 202N, etc.) may be generated, updated, and/or deleted by the FaaS function registry manager (126) using requests and/or function information obtained from clients (e.g., 100A, 100B, 100N, FIG. 1.1). Each function entry (e.g., 202A, 202B, 202N, etc.) may include a function image and function metadata associated with the function corresponding to the function entry (e.g., 202A, 202B, 202N, etc.). For example, the function A entry (202A) may include a function A image (204A) and function A metadata (206A), the function B entry (202B) may a include function B image (204B) and function B metadata (206B), the function N entry (202N) may include a function N image (204N) and function N metadata (206N), etc. Each of the aforementioned components of the function entries (e.g., 202A, 202B, 202N, etc.) is discussed below.

In one or more embodiments, a function image (e.g., 204A, 204B, 204N, etc.) may refer to one or more data structures (e.g., files) that include executable version of the function. The function image (e.g., 204A, 204B, 204N, etc.) may be in a format that may be executable by a computing device. The function image (e.g., 204A, 204B, 204N, etc.) may also include any information (e.g., function metadata (e.g., 204A, 204B, 204N, etc.), libraries, configuration settings, etc.) that may be required to execute the function image (e.g., 204A, 204B, 204N, etc.). The function image (e.g., 204A, 204B, 204N, etc.) may be provided to clients (e.g., 100, FIG. 1.1) or nodes of the FaaS environment (120, FIG. 1.1) for execution in order to host a workload or application generated using the function image (e.g., 204A, 204B, 204N, etc.). The function image (e.g., 204A, 204B, 204N, etc.) may include other and/or additional information and may be used for other and/or additional purposes without departing from embodiments disclosed herein.

In one or more embodiments, function metadata (e.g., 206A, 206B, 206N, etc.) may refer to one or more data structures that include information regarding functions corresponding to the function metadata (e.g., 206A, 206B, 206N, etc.). The function metadata (e.g., 206A, 206B, 206N, etc.) may be used to extract information about the corresponding function, for performing real-documentation and code-ahead during function development, and/or for querying the FaaS function registry (200) for functions that include matching metadata parameters. Each function entry (e.g., 202A, 202B, 202N, etc.) may include the same and/or different metadata parameters in the corresponding function metadata (e.g., 206A, 206B, 206N, etc.) without departing from embodiments disclosed herein. The contents of the function metadata (e.g., 206A, 206B, 206N, etc.) are discussed below in FIG. 2.2. For additional information associated with the contents of the function metadata (e.g., 206A, 206B, 206N, etc.), refer to FIG. 2.2. The function metadata (e.g., 206A, 206B, 206N, etc.) may include other and/or additional information and may be used for other and/or additional purposes without departing from embodiments disclosed herein.

Moving to FIG. 2.2, FIG. 2.2 shows a diagram of function metadata in accordance with one or more embodiments disclosed herein. Function A metadata (206A) may be an embodiment of the function metadata (e.g., 206A, 206B, 206N, etc.) discussed above. As discussed above, function A metadata (206A) may include information associated with the function corresponding to function A metadata (206A). Function A metadata (206A) may include the following metadata parameters: a function name (210), a function identifier (212), a function group (214), a function runtime (216), a function trigger (218), one or more function exception cases (220), a function body (222), function key-value pairs (224), function documentation (226), and a function signature (228). Function A metadata (206A) may include fewer, additional, or different types of metadata parameters without departing from embodiments disclosed herein. Each of the aforementioned function metadata parameters of function A metadata (206A) is discussed below.

In one or more embodiments, a function name (210) may refer to a combination of alphanumeric characters assigned to the function corresponding to function A metadata (206A). The user that generated the function may also generate and assign the function name (210) to the function. The function name (210) may be used by the user or other users to specify the function associated with the function name (210) from other functions. The function name (210) may include other and/or additional information associated with the function corresponding to function A metadata (206A) and may be used for other and/or additional purposes without departing from embodiments disclosed herein.

In one or more embodiments, a function identifier (212) may refer to a global, unique combination of alphanumeric characters assigned to the function corresponding to function A metadata (206A). The FaaS function registry manager (126, FIG. 1.3) may generate and assign the function identifier to the function corresponding to function A metadata (206A) when the function was added to the FaaS function registry (124, FIG. 1.3). As functions may include the same function names (e.g., 210) generated by users, the function identifier (212) may be unique for all functions included in the FaaS function registry used to specify the particular function associated with the function identifier from other functions. The function identifier (212) may include other and/or additional information associated with the function corresponding to function A metadata (206A) and may be used for other and/or additional purposes without departing from embodiments disclosed herein.

In one or more embodiments, a function group (214) may refer to a group identifier (e.g., a combination of alphanumeric characters) specifying a group of one or more functions that are grouped together. The function group (214) may be assigned to the function corresponding to function A metadata (206A). Functions may be grouped into a group for any reason, referred to herein as a grouping criteria, without departing from embodiments disclosed herein. Functions may be grouped together because, for example, they are part of the same project, make up the same application or workload, perform similar actions, etc. Other functions with the same function group (214) may be included in the same function group as the function corresponding to function A metadata (206A). The function group (214) may be generated and assigned to the function by a user when the function was developed or when provided to the FaaS function registry (124, FIG. 1.3). The function group (214) may be used to identify or query functions in the FaaS function registry (124, FIG. 1.3) that are in the same function group. The function group (214) may include other and/or additional information associated with the function corresponding to function A metadata (206A) and may be used for other and/or additional purposes without departing from embodiments disclosed herein.

In one or more embodiments, a function runtime (216) may specify the particular runtime environment in which the function corresponding to function A metadata (206A) is executed or run. The function runtime (216) may include a runtime identifier and/or a runtime version associated with the runtime corresponding to the function. The runtime environment may include the functionality to provide execution services for the function that enable the function to execute on a computing device. The execution services may include, managing interactions between the function and the underlying operating system, hardware, and other functions, security management, memory management, exception management, etc. The runtime environment may include other and/or additional functionalities associated with managing the execution of the function without departing from embodiments disclosed herein. The function runtime (216) may include any appropriate function runtime without departing from embodiments disclosed herein. The function runtime (216) may include, for example, .NET 6, .NET 7, .NET 8, Android Runtime (ART), Java Runtime, etc. The function runtime (216) may include other and/or additional information associated with the function corresponding to function A metadata (206A) and may be used for other and/or additional purposes without departing from embodiments disclosed herein.

In one or more embodiments, a function trigger (218) may refer to a trigger that specifies how (e.g., by the occurrence of an event) the function associated with function A metadata (206A) is invoked (e.g., begins execution). The function trigger (218) may be any type of function trigger associated with any event that may invoke the corresponding function without departing from embodiments disclosed herein. The trigger may be, for example, a timer trigger, an event trigger, an HTTP trigger, a webhook, notification trigger, queue trigger, storage trigger, etc. The function trigger (218) may specify the trigger and/or include a description of the trigger. The function trigger (218) may include other and/or additional information associated with the function corresponding to function A metadata (206A) and may be used for other and/or additional purposes without departing from embodiments disclosed herein.

In one or more embodiments, the function exception cases (220) may specify one or more unexpected behaviors or actions and the corresponding results (e.g., throws) associated with a function. There may be any type and/or quantity of unexpected behaviors/actions and corresponding exceptions without departing from embodiments disclosed herein. The function exception cases (220) may include error messages, error codes, descriptions of unexpected behaviors or actions that occur during the execution of the function, etc. The function exception cases (220) may be used to notify users or other programs of unexpected behaviors. The function exception cases (220) may be generated by users during development of the function corresponding to function A metadata (206A). The function exception cases (220) may include other and/or additional information associated with the function corresponding to function A metadata (206A) and may be used for other and/or additional purposes without departing from embodiments disclosed herein.

In one or more embodiments, the function body (222) may refer to the sequence of statements that include the actual code that is implemented when the function is executed and may follow the function signature (228). In other words, the function body (222) may explicitly specify the one or more actions performed by the function. The function body (222) may be written the programming language associated with the function. The function body (222) may be in any appropriate programming language without departing from embodiments disclosed herein. The function body (222) may be compiled into machine readable code and used to execute the function associated with the function body (222). The function body (222) may include other and/or additional information associated with the function corresponding to function A metadata (206A) and may be used for other and/or additional purposes without departing from embodiments disclosed herein.

In one or more embodiments, the function key-value pairs (224) may refer to one or more pairs of keys and corresponding key values used in a function. A key may be used one or more times in a function body (e.g., instead of hard-coded variables). When the function is run, the key may be replaced with the corresponding key value of the key-value pair. The key value may be changed without having to manually change the function body (e.g., changing one or more instances of hard-coded variables included in the function body). As such, key-value pairs may add flexibility to functions. The function key-value pairs (224) may be generated by users during the development of the corresponding function. The function key-value pairs (224) may be used to execute the function. The function key-value pairs (224) may include other and/or additional information associated with the function corresponding to function A metadata (206A) and may be used for other and/or additional purposes without departing from embodiments disclosed herein.

In one or more embodiments, the function documentation (226) may refer to one or more comments or descriptions associated with the function corresponding to the function documentation (226). The comments or descriptions may explain, describe, or otherwise provide information useful to users of the function and may be associated with all, or parts, of the function. The function documentation (226) may (i) include a summary of the actions performed by the function, and/or (ii) describe variables, statements, key-value pairs, exception cases, function groups, user comments, or other components or information associated with the function. The function documentation (226) may be generated by a user during the development of the function corresponding to the function documentation (226). The function documentation (226) may be used by users to extract information associated with the function that may not be ascertained, or may not be easily ascertained, from the function body itself. The function documentation (226) may include other and/or additional information associated with the function corresponding to function A metadata (206A) and may be used for other and/or additional purposes without departing from embodiments disclosed herein.

In one or more embodiments, the function signature (228) may refer to one or more parameters that define or specify generic information associated with the function such as the function name, the input arguments or parameters, exceptions, and/or the return type of the corresponding function. The function signature (228) may be generated by a user during the development of the function corresponding to the function signature (228). The function signature (228) may include other and/or additional information associated with the function corresponding to function A metadata (206A) and may be used for other and/or additional purposes without departing from embodiments disclosed herein.

While the data structures (e.g., 200, 202A, 202B, 202N, etc.) and other data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the a storage (not shown) of one or more nodes (e.g., 122A, 122B, 122N, etc., FIG. 1.3) of the FaaS environment (120, FIG. 1.3), any of the aforementioned data structures may be stored in different locations (e.g., in storage of other computing devices) and/or spanned across any number of computing devices without departing from embodiments disclosed herein. The data structures discussed in this Detailed Description may be implemented using, for example, file systems, lists, linked lists, tables, unstructured data, databases, etc.

FIG. 3.1 shows a flowchart of a method for managing a function-as-a-service registry in accordance with one or more embodiments disclosed herein. The method shown in FIG. 3.1 may be performed by, for example, a FaaS function registry manager of a FaaS environment (e.g., 126, FIG. 1.3). Other components of the system in FIGS. 1.1-1.3 may perform all, or a portion, of the method of FIG. 3.1 without departing from the scope of the embodiments described herein. While FIG. 3.1 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 300, a FaaS function registry update request is obtained from a client. In one or more embodiments, the FaaS function registry manager may obtain a request from a user of client. The request may be a FaaS function registry request generated by the user and/or the client. The request may be provided to the FaaS function registry manager using any appropriate techniques of data transmission without departing from embodiments disclosed herein. As an example, the request may be submitted to the FaaS function registry manager as an application programming interface (API) call. Further yet, the request may be sent as a message including one or more network packets through one or more network devices that operatively connect the client and user with the FaaS function registry manager. The FaaS function registry update request may be obtained from the client via other and/or additional methods without departing from embodiments disclosed herein.

In Step 302, a determination is made as to whether the FaaS function registry update request is associated with adding a new function. In one or more embodiments, the FaaS function registry update request may include a request type indicator that may specify the type of request the FaaS function registry update request. The request type indicator may include, for example, a set flag, a set bit, a tag, or other indicator that, when present or set indicates that the request is associated with adding a new function to the FaaS function registry. In one or more embodiments, the FaaS function registry manager may parse the request to identify whether the indicator for adding a new function is set or present in the request. In one or more embodiments disclosed herein, if the indicator for adding a new function is set or present in the request, then the FaaS function registry manager may determine that the FaaS function registry update request is associated with adding a new function. In one or more embodiments disclosed herein, if the indicator for adding a new function is not set or present in the request, then the FaaS function registry manager may determine that the FaaS function registry update request is not associated with adding a new function. The determination as to whether the FaaS function registry update request is associated with adding a new function may be made via other and/or additional methods without departing from embodiments disclosed herein.

In one or more embodiments disclosed herein, if it is determined that the FaaS function registry update request is associated with adding a new function, then the method may proceed to Step 304. In one or more embodiments disclosed herein, if it is determined that the FaaS function registry update request is not associated with adding a new function, then the method may proceed to Step 310.

In Step 304, a function image may be obtained for the client. The function image may be an embodiment of the function images discussed above in FIG. 2.1. In one or more embodiments, the function image may be included in, or sent along with, the FaaS function registry update request. Accordingly, the FaaS function registry manager may obtain the function image from the FaaS function registry update request.

In alternative embodiments, the FaaS function registry manager may send a request for the function image to the client. In response to obtaining the request, the user and/or the client may generate and/or send the function image associated with the FaaS function registry update request to the FaaS function registry manager. The function image request and function image may be sent using any appropriate techniques of data transmission without departing from embodiments disclosed herein. As an example, the request and function image may be sent using one or more API calls. Further yet, the request and function image may be sent as one or more messages including one or more network packets through one or more network devices that operatively connect the client and user with the FaaS function registry manager. The function image may be obtained from the client via other and/or additional methods without departing from embodiments disclosed herein.

In Step 306, function metadata associated with the function is obtained from the client. The function metadata may be an embodiment of the function metadata discussed above in FIGS. 2.1-2.2. In one or more embodiments, the function metadata may be included in, or sent along with, the FaaS function registry update request. Accordingly, the FaaS function registry manager may obtain the function metadata from the FaaS function registry update request.

In alternative embodiments, the FaaS function registry manager may send a request for the function metadata to the client. In response to obtaining the request, the user and/or the client may generate and/or send the function metadata associated with the FaaS function registry update request to the FaaS function registry manager. The function metadata request and function metadata may be sent using any appropriate techniques of data transmission without departing from embodiments disclosed herein. As an example, the request and function metadata may be sent using one or more API calls. Further yet, the request and function metadata may be sent as one or more messages including one or more network packets through one or more network devices that operatively connect the client and user with the FaaS function registry manager. The function metadata associated with the function may be obtained from the client via other and/or additional methods without departing from embodiments disclosed herein.

In Step 308, a new FaaS function registry function entry associated with the function is generated using the function image and the function metadata. In one or more embodiments, the FaaS function registry manager may generate a new function entry associated with the function in the FaaS function registry. The FaaS function registry manager may include the function image and the function metadata associated with the function in the function entry. As such, the function may now be queried by other users (e.g., via clients) from the FaaS function registry based on any of the metadata parameters included in the function metadata of the function entry using generic query requests. The users may not be required to know bespoke function registry requirements (e.g., platform-specific function signatures, API calls, etc.) to obtain the function from the FaaS function registry for software development. Additionally, function developers of clients may be integrated with the FaaS function registry and may automatically pull the function metadata included in the FaaS function registry associated with the function based on user inputs to function developers. The pulled function metadata may be used to perform code-ahead and real-time documentation associated with the function. Finally, the function may be pulled from the function registry by one or more nodes in FaaS environment and executed to perform workloads at the direction of users. The new FaaS function registry function entry associated with the function may be generated using the function image and the function metadata via other and/or additional methods without departing from embodiments disclosed herein.

In one or more embodiments disclosed herein, the method may end following Step 308.

In Step 310, a determination is made as to whether the FaaS function registry update request is associated with updating an existing function. In one or more embodiments, the FaaS function registry update request may include a request type indicator that may specify the type of request the FaaS function registry update request. The request type indicator may include, for example, a set flag, a set bit, a tag, or other indicator that, when present or set indicates that the request is associated with updating an existing function already included in the FaaS function registry. In one or more embodiments, the FaaS function registry manager may parse the request to identify whether the indicator for updating an existing function is set or present in the request. In one or more embodiments disclosed herein, if the indicator for updating an existing function is set or present in the request, then the FaaS function registry manager may determine that the FaaS function registry update request is associated with updating an existing function. In one or more embodiments disclosed herein, if the indicator for updating an existing function is not set or present in the request, then the FaaS function registry manager may determine that the FaaS function registry update request is not associated with updating an existing function. The determination as to whether the FaaS function registry update request is associated with updating an existing function may be made via other and/or additional methods without departing from embodiments disclosed herein.

In one or more embodiments disclosed herein, if it is determined that the FaaS function registry update request is associated with updating an existing function, then the method may proceed to Step 312. In one or more embodiments disclosed herein, if it is determined that the FaaS function registry update request is not associated with updating an existing function, then the method may proceed to Step 318.

In Step 312, a function associated with the request is identified. In one or more embodiments, the request may further include the function identifier associated with function targeted by the update request. In one or embodiments, the FaaS function registry manager may parse the request to obtain the function identifier. The FaaS function registry manager may then compare the function identifier included in the request with the function registry identifiers included in the function entries of the FaaS function registry to identify the function entry that includes a matching function entry. The FaaS function registry manager may identify the function associated with function entry in the FaaS function registry with the matching function identifier as the function that is associated with the request. The function associated with the request may be identified via other and/or additional methods without departing from embodiments disclosed herein.

In Step 314, updated function information is obtained from the client. The updated function information may include an updated function image and/or updated function metadata. The updated function image and the updated function metadata may be an embodiment of the function image and function metadata discussed above in FIGS. 2.1-2.2. The updated function metadata may include all, or a portion of, the metadata parameters associated with the function. In one or more embodiments, the updated function information may be included in, or sent along with, the FaaS function registry update request. Accordingly, the FaaS function registry manager may obtain the updated function information from the FaaS function registry update request.

In alternative embodiments, the FaaS function registry manager may send a request for the updated function information to the client. In response to obtaining the request, the user and/or the client may generate and/or send the updated function information associated with the FaaS function registry update request to the FaaS function registry manager. The updated function information request and the updated function information may be sent using any appropriate techniques of data transmission without departing from embodiments disclosed herein. As an example, the request and updated function information may be sent using one or more API calls. Further yet, the request and updated function information may be sent as one or more messages including one or more network packets through one or more network devices that operatively connect the client and user with the FaaS function registry manager. The updated function information may be obtained from the client via other and/or additional methods without departing from embodiments disclosed herein.

In Step 316, the FaaS function registry entry associated with the function is updated using the updated function information. In one or more embodiments, the FaaS function registry manager may replace the function image and/or all, or a portion of the function metadata included in the function entry with the updated function information. In embodiments where only a portion of the metadata parameters are included in the updated function information, the FaaS function registry manager may only replace the corresponding metadata parameters in the function metadata with the updated function metadata while leaving the other existing function metadata parameters. The FaaS function registry entry associated with the function may be updated using the updated function information via other and/or additional methods without departing from embodiments disclosed herein.

In one or more embodiments disclosed herein, the method may end following Step 316.

In Step 318, a function associated with the FaaS function registry update request is identified. In one or more embodiments, the request may further include the function identifier associated with function targeted by the update request. In one or embodiments, the FaaS function registry manager may parse the request to obtain the function identifier. The FaaS function registry manager may then compare the function identifier included in the request with the function registry identifiers included in the function entries of the FaaS function registry to identify the function entry that includes a matching function entry. The FaaS function registry manager may identify the function associated with function entry in the FaaS function registry with the matching function identifier as the function that is associated with the request. The function associated with the request may be identified via other and/or additional methods without departing from embodiments disclosed herein.

In Step 320, the FaaS function registry function entry associated with the function is deleted. In one or more embodiments, the FaaS function registry manager may delete, overwrite, or otherwise remove the function entry associated with the function from the FaaS function registry. As such, the function may no longer be included in the FaaS function registry to be queried or obtained by users of clients operatively connected to the to the FaaS environment. The FaaS function registry function entry associated with the function may be deleted via other and/or additional methods without departing from embodiments disclosed herein.

In one or more embodiments disclosed herein, the method may end following Step 320.

FIG. 3.2 shows a flowchart of a method for performing a query of a function-as-a-service registry in accordance with one or more embodiments disclosed herein. The method shown in FIG. 3.2 may be performed by, for example, a FaaS function registry manager of a FaaS environment (e.g., 126, FIG. 1.3). Other components of the system in FIGS. 1.1-1.3 may perform all, or a portion, of the method of FIG. 3.2 without departing from the scope of the embodiments described herein. While FIG. 3.2 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 330, a user query parameter is obtained from a client. In one or more embodiments, the user query parameter may include all, or a portion of, a metadata parameter associated with one or more functions included in the FaaS function registry. The metadata parameter may include one of the metadata parameters discussed above in FIG. 2.2. The user query parameter may be generated by a user of the client and sent to the FaaS function registry manager by the client. The user may generate any quantity of user query parameters including any combination of metadata parameters without departing from embodiments disclosed herein.

The user query parameter may be provided to the FaaS function registry manager using any appropriate techniques of data transmission without departing from embodiments disclosed herein. As an example, the user query parameter may be submitted to the FaaS function registry manager using one or more API calls. Further yet, the user query parameter may be sent as a message including one or more network packets through one or more network devices that operatively connect the client and user with the FaaS function registry manager. The user query parameter may be obtained from the client via other and/or additional methods without departing from embodiments disclosed herein.

In Step 332, the user query parameter is compared with FaaS function registry metadata parameters. In one or more embodiments, the FaaS function registry manager may compare the user query parameter with the corresponding metadata parameter in each function entry in the FaaS function registry. If a function entry does not include the metadata parameter corresponding to the user query parameter, the FaaS function registry manager may skip the function entry during the comparison. As an example, the user query parameter may include a function group and the FaaS function registry manager may compare the user query parameter with the function group included in each function entry of the FaaS function registry. The user query parameter may be compared with the FaaS function registry metadata parameters via other and/or additional methods without departing from embodiments disclosed herein.

In Step 334, at least one function in the FaaS function registry with metadata parameters that match the user query parameter is identified. In one or more embodiments, the FaaS function registry manager may identify all function entries that include a metadata parameter that matches the user query parameter. The FaaS function registry manager may identify any quantity of function entries that include the same metadata parameter that matches the user query parameter without departing from embodiments disclosed herein. The function associated with each identified function entry may be identified as functions that satisfy or match the user query parameter. The at least one function in the FaaS function registry with metadata parameters that match the user query parameter may be identified via other and/or additional methods without departing from embodiments disclosed herein.

In Step 336, function information associated with the at least one identified function is provided to the client. In one or more embodiments, the FaaS function registry manager may obtain and send function information included in the function entry associated with the at least one identified function to the client. The function information may include the function image and/or all, or a portion of, the function metadata associated with the at least one identified function. The user query parameter may further specify the desired function information to be returned from the query of the FaaS function registry. The FaaS function registry manager may obtain and send only the desired information to the client. For example, the user query parameter may only desire the function body, the function signature, and function exception cases associated with the at least one identified function. Accordingly, the FaaS function registry manager may only obtain and send the function body, the function signature, and function exception cases associated with the at least one identified function to the client. The function information may be provided to the client using any appropriate techniques of data transmission without departing from embodiments disclosed herein. As an example, the function information may be sent as a message including one or more network packets through one or more network devices that operatively connect the client and user with the FaaS function registry manager.

In one or more embodiments disclosed herein, the method may end following Step 336.

FIG. 3.3 shows a flowchart of a method for performing code-ahead and real-time documentation using a function-as-a-service registry in accordance with one or more embodiments disclosed herein. The method shown in FIG. 3.3 may be performed by, for example, a function developer of a client (e.g., 102, FIG. 1.2). Other components of the system in FIGS. 1.1-1.3 may perform all, or a portion, of the method of FIG. 3.3 without departing from the scope of the embodiments described herein. While FIG. 3.3 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 340, user inputs are obtained. In one or more embodiments, the function developer may obtain user inputs from a user. The function developer may provide a user interface such as a GUI on a display screen that provides information to the user and enables the user to interact with the user interface to provide user inputs. Users may interact with the user interface by, for example, touching a touchscreen, clicking on certain areas of the user interface with a mouse, inputting text through a keyboard, etc. The function developer may obtain the user inputs via the user interface. The user inputs may include all, or a portion, of a function metadata parameter such as a function name, function identifier, function signature, etc. that may be used to query the FaaS function registry. The user inputs may be obtained via other and/or additional methods without departing from embodiments disclosed herein.

In Step 342, the FaaS function registry is queried using the user inputs. In one or more embodiments, the user inputs may be used as user query parameters. The function developer may send the user query parameters to the FaaS function registry manager of the FaaS environment. The FaaS function registry manager may query the FaaS function registry via the methods discussed above in FIG. 3.2. For additional information regarding querying the FaaS function registry, refer to FIG. 3.2. The user query parameter may be provided to the FaaS function registry manager using any appropriate techniques of data transmission without departing from embodiments disclosed herein. As an example, the user query parameter may be submitted to the FaaS function registry manager using one or more API calls made by the function developer. Further yet, the user query parameter may be sent as a message including one or more network packets through one or more network devices that operatively connect the client and user with the FaaS function registry manager. The FaaS function registry may be queried using the user inputs via other and/or additional methods without departing from embodiments disclosed herein.

In Step 344, function metadata associated with the user inputs are obtained from the FaaS function registry. In response to performing the query of the FaaS function registry, the FaaS function registry manager may provide function metadata associated with at least one function included in the FaaS function registry that match the user inputs. The function metadata may be provided to the function developer of the client using any appropriate techniques of data transmission without departing from embodiments disclosed herein. As an example, the function metadata may be sent as one or more messages including one or more network packets through one or more network devices that operatively connect the function developer of the client with the FaaS function registry manager. Function metadata associated with the user inputs may be obtained from the FaaS function registry via other and/or additional methods without departing from embodiments disclosed herein.

In Step 346, code-ahead and real-time document is performed on a user interface based on the obtained function metadata. In one or more embodiments, the function developer may use the obtained function metadata to perform code-ahead and real-time documentation.

In one or more embodiments, code-ahead may refer to completing all, or a portion of, a function using the function metadata obtained from the function registry. As such, the function body, function variables, key-value pairs, function signature, function exception cases, etc. may be automatically completed by the function developer using the function metadata and displayed to the user. The function developer may provide the user with an option to confirm the completed portion of the function. In embodiments where function metadata associated with multiple functions are obtained as a result of the FaaS function registry query, then the function developer may display multiple options for code-ahead and may provide the user with an option to select a code-ahead option. The function developer may then implement the code-ahead option selected by the user. Uses may then use or modify (e.g., renaming the function, changing variable values/names, etc.) the completed portions of function resulting from code-ahead. Performing code-ahead may greatly improve the speed and efficiency of developing functions, applications, or other software-based projects, while greatly reducing the complexity and burden on the user. By integrating code-ahead with the FaaS function registry, users may efficiently and easily use a large pool of many kinds of functions developed by other users and may not need detailed knowledge of each function included in the FaaS function registry in order to gain the benefits of code-ahead or otherwise using the functions. Performing code-ahead may include other and/or additional methods without departing from embodiments disclosed herein.

In one or more embodiments, real-time documentation may refer to automatically including in the function or displaying all, or a portion (e.g., function documentations associated with specific portions of the function such as variables, key-value pairs, signature, etc.) function documentation included in the function metadata obtained from the FaaS function registry on the user interface to the user.

As such, current function documentation associated with the function, which may be updated in the FaaS function registry by other users over time, may automatically be incorporated into the function or displayed to the user during function development to provide the user with the latest information associated with FaaS function registry functions that are being used or obtained by the user. This may greatly reduce the complexity and burden on users when using functions included in the FaaS registry. Performing real-time documentation may include other and/or additional methods without departing from embodiments disclosed herein.

Code-ahead and real-time document may be performed on a user interface based on the obtained function metadata via other and/or additional methods without departing from embodiments disclosed herein.

In Step 348, a determination is made as to whether there are additional user inputs. In one or more embodiments, the function developer may obtain additional user inputs via the methods discussed above in Step 340. The user may provide additional user inputs that may be queried with the FaaS function registry to code an additional function, to change the current function, etc. In one or more embodiments disclosed herein, if the user provides additional user inputs that may be used to query the FaaS function registry, then the function developer may determine that there are additional user inputs. In one or more embodiments disclosed herein, if the user does not provide additional user inputs that may be used to query the FaaS function registry, then the function developer may determine that there are no additional user inputs. The determination as to whether there are additional user inputs may be made via other and/or additional methods without departing from embodiments disclosed herein.

In one or more embodiments disclosed herein, if it is determined that there are new user inputs, then the method may proceed to Step 342. In one or more embodiments disclosed herein, if it is determined that there are no new user inputs, then the method may proceed to Step 350.

In Step 350, a determination is made as to whether the session has ended. In one or more embodiments, the user may terminate the user session associated with the function developer. The user may terminate the user session by, powering off the client, closing the function developer window associated with user session, or any other action that terminates the user session without departing from embodiments disclosed herein. In one or more embodiments disclosed herein, if the user session is terminated, then the function developer may determine that the session has ended. In one or more embodiments disclosed herein, if the user session is not terminated continuing to execute, then the function developer may determine that the session has not ended. The determination as to whether the session has ended may be made via other and/or additional methods without departing from embodiments disclosed herein.

In one or more embodiments disclosed herein, if it is determined that the session has ended, then the method may end following Step 350. In one or more embodiments disclosed herein, if it is determined that the session has not ended, then the method may proceed to Step 348.

To further clarify the embodiments disclosed herein, a non-limiting example use case is provided in FIGS. 4.1-4.4.

START OF EXAMPLE

The example use case, illustrated in FIGS. 4.1-4.4, is not intended to limit the scope of the embodiments disclosed herein and is independent from any other examples discussed in this application. FIGS. 4.1-4.4 illustrate an example implementation of a FaaS function registry providing FaaS function registry services to clients.

Turning now to FIG. 4.1, FIG. 4.1 shows a diagram of the example system. The system includes two client, client A (400A) used by John and client B (400B) used by Mary. The system further includes an FaaS environment (400) that includes an FaaS function registry (424) that includes three function entries associated with three functions, function A entry (426A), function B entry (426B), and function C entry (426C). The two clients (400A, 400B) are operatively connected to the FaaS environment (420) via a network (440). For the sake of brevity, not all components included in the systems of FIG. 1.1-1.3 or involved in the example may be discussed in FIGS. 4.1-4.4.

At a first point in time, John, through client A (100) generates a function, function A. John may also generate function metadata associated with the function. Function A may be a function called "SendEmail" and may include the following function metadata parameters: function name, function signature, function trigger, function body, function runtime, and function exception cases. John may add the function to a function group including function B which is associated with the function B entry (426B) of the FaaS function registry (424). The function group may be added to the function metadata associated with function A. John may then send function A and its corresponding function metadata to the FaaS environment (420). Upon obtaining function A, the FaaS environment (420) may generate a function entry for function A, function A entry (426A), and include the function image and function metadata associated with function A in the function A entry (426A). As such, Mary and John and any other user connected to the FaaS environment (420) may query the FaaS function registry (424) using any of the function metadata parameters associated with function A to obtain function A or function A metadata or enjoy code-ahead and real-time documentation using the function metadata of function A included in the FaaS function registry (420).

FIG. 4.2 shows a diagram of function A, example function (450) and associated function metadata. The example function (450) includes code documentation (452), a function signature (454), a function body (456), a function runtime (458), a function trigger definition (460), and function exceptions (462). All of the aforementioned metadata parameters are stored in the function A entry (426A, FIG. 4.1) of the FaaS function registry (424, FIG. 4.1) and may be used as query parameters to obtain the function and for code-ahead and real-time documentation.

Returning to the discussion of FIG. 4.1, at a later point in time, Mary begins developing a function on an IDE of client B (400B) integrated with the FaaS function registry (424). Mary makes several user inputs and writes out a function name, "Blobs. Write" associated with function C which may be included in the function C entry (426C) of the FaaS function registry (424). The IDE then queries the FaaS function registry (424) using the function name and obtain function metadata associated with function C from the function C entry (426C). The IDE performs real-time documentation using the function metadata by displaying information associated with function C to Mary. FIG. 4.3 shows an example real-time-documentation (470) displayed to Mary on client B (400B). The IDE also performs code-ahead by autocompleting a portion of function C using the function metadata. FIG. 4.4 shows an example code-ahead (480) performed by the IDE for Mary during development of function C. Mary then completes her development of function C using the real-time documentation and code-ahead provided by the IDE and the integration with the FaaS function registry (424).

End of Example

Turning now to FIG. 5, FIG. 5 shows a diagram of a computing device in accordance with one or more embodiments disclosed herein.

In one or more embodiments disclosed herein, the computing device (500) may include one or more computer processors (502), non-persistent storage (504) (e.g., volatile memory, such as RAM, cache memory), persistent storage (506) (e.g., a non-transitory computer readable medium, a hard disk, an optical drive such as a CD drive or a DVD drive, a Flash memory, etc.), a communication interface (512) (e.g., Bluetooth interface, infrared interface, network interface, optical interface, etc.), an input device(s) (510), an output device(s) (508), and numerous other elements (not shown) and functionalities. Each of these components is described below.

In one or more embodiments, the computer processor(s) (502) may be an integrated circuit for processing instructions. For example, the computer processor(s) (502) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (e.g., a LAN, a WAN, Internet, mobile network, etc.) and/or to another device, such as another computing device.

In one or more embodiments, the computing device (500) may include one or more output devices (508), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a function registry, comprising:
obtaining, by a function-as-a-service (FaaS) function registry manager of a FaaS environment, a user query parameter from a first client, wherein the FaaS environment comprises a FaaS function registry;
in response to the obtaining:
comparing the user query parameter with metadata parameters of the FaaS function registry, wherein the metadata parameters comprise a function runtime, a function trigger, a function exception case, a function body, a function key-value pair, function documentation, and a function signature;
identifying at least a first function in the FaaS function registry with at least one of the metadata parameters that match the user query parameter;
obtaining the first function from the FaaS function registry;
providing a first function image and first function metadata associated with the at least the first function to the first client;
performing, by the first client, code-ahead and real-time documentation in parallel using the first function image and the first function metadata, to obtain a completed function, wherein:
the performing code-ahead comprises:
completing partial function inputs made by a user of the first client in a function developer of a graphical user interface (GUI) using the first function image and the first function metadata;
displaying multiple options for the code-ahead, wherein the multiple options include the first function image and unique functions related to the first function image; and
selecting, by the user within the function developer of the GUI, a function from the multiple options to obtain the completed function, and
the performing real-time documentation using the first function image and the first function metadata comprises displaying documentation of the first function included in the first function metadata automatically as the user of the first client makes function inputs in the function developer; and
modifying, by the user within the function developer of the GUI, the completed function to obtain a final function.

2. The method of claim 1, wherein the FaaS function registry comprises a plurality of function entries.

3. The method of claim 2, wherein each function entry of the plurality of function entries comprises a function image and function metadata.

4. The method of claim 3, wherein the function metadata comprises a plurality of function metadata parameters comprising at least one of:
a function runtime,
a function trigger, and
at least one function exception case.

5. The method of claim 1, wherein the FaaS function registry comprises:
a second function entry associated with a second function generated by a second client;
a third function entry associated with a third function generated by a third client; and
a first function entry associated with the first function generated by a fourth client.

6. The method of claim 5, further comprising:
obtaining a FaaS function registry update request from the second client;

in response to obtaining the request:
   making a determination that the FaaS function registry update request is associated with adding a new function to the FaaS function registry;
   in response to making the determination:
      obtaining a second function image associated with the second function from the second client;
      obtaining second function metadata associated with the second function from the second client; and
      generating the second function entry using the second function image and the second function metadata.

7. A non-transitory computer readable medium comprising computer readable program code, which when executed by a computer processor enables the computer processor to perform a method for managing a function registry, the method comprising:
   obtaining, by a function-as-a-service (FaaS) function registry manager of a FaaS environment, a user query parameter from a first client, wherein the FaaS environment comprises a FaaS function registry;
   in response to the obtaining:
      comparing the user query parameter with metadata parameters of the FaaS function registry, wherein the metadata parameters comprise a function runtime, a function trigger, a function exception case, a function body, a function key-value pair, function documentation, and a function signature;
      identifying at least a first function in the FaaS function registry with at least one of the metadata parameters that match the user query parameter;
      obtaining the first function from the FaaS function registry;
      providing a first function image and first function metadata associated with the at least the first function to the first client;
      performing, by the first client, code-ahead and real-time documentation in parallel using the first function image and the first function metadata, to obtain a completed function, wherein:
         the performing code-ahead comprises:
            completing partial function inputs made by a user of the first client in a function developer of a graphical user interface (GUI) using the first function image and the first function metadata;
            displaying multiple options for the code-ahead, wherein the multiple options include the first function image and unique functions related to the first function image; and
            selecting, by the user within the function developer of the GUI, a function from the multiple options to obtain the completed function, and
         the performing real-time documentation using the first function image and the first function metadata comprises displaying documentation of the first function included in the first function metadata automatically as the user of the first client makes function inputs in the function developer; and
      modifying, by the user within the function developer of the GUI, the completed function to obtain a final function.

8. The non-transitory computer readable medium of claim 7, wherein the FaaS function registry comprises a plurality of function entries.

9. The non-transitory computer readable medium of claim 8, wherein each function entry of the plurality of function entries comprises a function image and function metadata.

10. The non-transitory computer readable medium of claim 9, wherein the function metadata comprises a plurality of function metadata parameters comprising at least one of:
   a function runtime,
   a function trigger, and
   at least one function exception case.

11. The non-transitory computer readable medium of claim 7, wherein the FaaS function registry comprises:
   a second function entry associated with a second function generated by a second client;
   a third function entry associated with a third function generated by a third client; and
   a first function entry associated with the first function generated by a fourth client.

12. The non-transitory computer readable medium of claim 11, further comprising:
   obtaining a FaaS function registry update request from the second client;
   in response to obtaining the request:
      making a determination that the FaaS function registry update request is associated with adding a new function to the FaaS function registry;
      in response to making the determination:
         obtaining a second function image associated with the second function from the second client;
         obtaining second function metadata associated with the second function from the second client; and
         generating the second function entry using the second function image and the second function metadata.

13. A system for managing a function registry, comprising:
   clients operatively connected to an Function-as-a-service (FaaS) environment; and
   a FaaS function registry manager of the FaaS environment, wherein the FaaS function registry manager comprises a processor and memory and the processor is configured to perform a method comprising:
   obtaining a user query parameter from a first client of the clients, wherein the FaaS environment comprises a FaaS function registry;
   in response to the obtaining:
      comparing the user query parameter with metadata parameters of the FaaS function registry, wherein the metadata parameters comprise a function runtime, a function trigger, a function exception case, a function body, a function key-value pair, function documentation, and a function signature;
      identifying at least a first function in the FaaS function registry with at least one of the metadata parameters that match the user query parameter;
      obtaining the first function from the FaaS function registry;
      providing a first function image and first function metadata associated with the at least the first function to the first client;
      performing, by the first client, code-ahead and real-time documentation in parallel using the first function image and the first function metadata, to obtain a completed function, wherein:
         the performing code-ahead comprises:
            completing partial function inputs made by a user of the first client in a function developer of a graphical user interface (GUI) using the first function image and the first function metadata;
            displaying multiple options for the code-ahead, wherein the multiple options include the first function image and unique functions related to the first function image; and selecting, by the user within the function developer of the GUI, a function from the multiple options to obtain the completed function, and the performing real-time documentation using the first function image and the first function metadata comprises displaying documentation of the first function included in the first function metadata automatically as the user of the first client makes function inputs in the function developer; and modifying, by the user within the function developer of the GUI, the completed function to obtain a final function.

14. The system of claim 13, wherein the FaaS function registry comprises a plurality of function entries.

* * * * *